United States Patent [19]
Cohen et al.

[11] Patent Number: 5,367,621
[45] Date of Patent: Nov. 22, 1994

[54] DATA PROCESSING METHOD TO PROVIDE A GENERALIZED LINK FROM A REFERENCE POINT IN AN ON-LINE BOOK TO AN ARBITRARY MULTIMEDIA OBJECT WHICH CAN BE DYNAMICALLY UPDATED

[75] Inventors: Amy S. C. Cohen, Silver Spring; Christopher F. Gleason, Gaithersburg; Donald R. Hyatt, Silver Spring, all of Md.; Michael E. Moran, Woodstock, N.Y.; Jeffrey N. Stevens, Gaithersburg, Md.; Alan J. Wecker, Haifa, Israel

[73] Assignee: International Business Machines Corporation, Armonk, N.Y.

[21] Appl. No.: 755,709

[22] Filed: Sep. 6, 1991

[51] Int. Cl.$^5$ ............................................. G06F 15/62
[52] U.S. Cl. ................................... 395/154; 395/144; 395/148; 395/275; 395/600
[58] Field of Search ............... 395/153, 154, 275, 600, 395/148, 144; 340/717, 721, 345; 345/1, 2; 364/282.1

[56] References Cited

U.S. PATENT DOCUMENTS

| | | | |
|---|---|---|---|
| 4,435,779 | 3/1984 | Mayer et al. | 364/900 |
| 4,692,757 | 9/1987 | Tsuhara et al. | 340/721 |
| 4,815,029 | 3/1989 | Barker et al. | 364/900 |
| 4,829,470 | 5/1989 | Wang | 364/900 |
| 4,893,256 | 1/1990 | Rutherfoord et al. | 364/518 |
| 4,914,586 | 4/1990 | Swinehart et al. | 364/200 |
| 4,931,950 | 6/1990 | Isle et al. | 364/513 |
| 4,933,880 | 6/1990 | Borgendale et al. | 364/523 |
| 4,939,672 | 7/1990 | Meadows | 364/521 |
| 4,941,193 | 7/1990 | Barnsley et al. | 382/56 |
| 4,967,375 | 10/1990 | Pelham et al. | 364/518 |
| 4,974,194 | 11/1990 | Barker et al. | 364/900 |
| 5,008,853 | 4/1991 | Bly et al. | 364/900 |
| 5,109,482 | 4/1992 | Bohrman | 395/154 |

FOREIGN PATENT DOCUMENTS

| | | |
|---|---|---|
| 4157962 | 8/1990 | European Pat. Off. |
| 8811925 | 5/1989 | Japan |

OTHER PUBLICATIONS

Gibson, et al., "Set of Algorithms for Defining, Querying, ..." vol. 30, No. 8, Jan. 1988, pp. 123-127, IBM TDB.

Kendrick, et al., "Method for Supporting Non-Text Objects in ..." IBM TDB, vol. 30, No. 8, Jan. 1988, pp. 155-162.

Elliott, et al., "Technique for Retaining, Saving and ..." IBM TDB, vol. 30, No. 8, Jan. 1988, pp. 163-164.

J. Nielsen, "Hypertext II", SIGCHI Bulletin, vol. 21, No. 2, Oct. 1989, pp. 41-47.

vol. 21, No. 1, pp. 65-67 J. Nielsen, "Hyperhyper: Developments Across the Field of Hypermedia-A Mini Trip Report: BCS Workshop, London, UK, 23 Feb. 1989, " SIGCHI Bulletin.

(List continued on next page.)

Primary Examiner—Heather R. Herndon
Assistant Examiner—Joseph H. Feild
Attorney, Agent, or Firm—John E. Hoel; Edward H. Duffield

[57] ABSTRACT

A generalized link is provided in a data processing system to enable referencing from a point within an organized hierarchy of an on-line softcopy text, to an arbitrary multimedia object. The multimedia object may be represented by data which is also contained within the softcopy book or alternately which may be separate from the book as a separate file or a separate data base. This enables an author at the time of writing the softcopy book, to specify specific multimedia hardware and software support for the display of multimedia presentations accompanying the text in the book. Provision is made for the author to specify alternate forms of multimedia presentation, where a particular specified multimedia apparatus or supporting software is not present at a workstation. An improved method for dynamically updating a softcopy book to a new edition is also disclosed.

8 Claims, 18 Drawing Sheets

OTHER PUBLICATIONS

J. Nielsen, "Trip Report: Hypertext '89," SIGCHI Bulletin, vol. 21, No. 4, Apr. 1990, pp. 52–61.
A. Pearl, "Sun's Link Service: A Protocol for Open Linking", Hypertext '89 Proceedings, Nov. 1989, pp. 137–146.
"An Overview of Hypertext and Hypermedia," Concepts & Issues, EP10-010-701, Nov. 1989.
"Multimedia Authoring Systems," PC Magazine, Jul. 1990, pp. 163–192.
E. Bender, "Desktop Multimedia: You Ain't Seen Nothing Yet," PC World, Mar. 1990, pp. 191–196.
S. Ditlea, "Hypted," PC/Computing, Oct. 1990, 201–210.
Beauliev et al., "Hierarchy in Picture Segmentation: A Stepwise Optimization Approach", IEEE Transactions on Pattern Analysis and Machine Intelligence, Feb. 1989, pp. 150–163.

| FILE INDEX 105 | |
|---|---|
| LINK DESCRIPTION TAGS 102 | (FIG. 1a) |
| BOOK TEXT WITH TAGS 104 | (FIG. 1b) |
| INTERNAL ANIMATION OBJECT 106 | (FIG. 1c) |
| INTERNAL AUDIO OBJECT 108 | (FIG. 1d) |
| INTERNAL GRAPHICS OBJECT 110 | (FIG. 1e) |

OBJECT='family_clip.anm'    Motion Picture in Bit Map Animation Sequence

OBJECT='trumpet.aud'          Audio Data 184

```
:LDESC ID=eleph_movie    OBJTYPE=video                              ← 120

OBJECT='family_clip.vid'
                         STORE=external
                         DATA='video.exe \ CD Video File Format A'
                         RUNTEXT='African Elephant Family Video'

AUTOLAUNCH=no
                         VIEW=center
                         STYLE=2

ALT_OBJECT='family_clip.anm'
                         ALT-STORE=internal
                         ALT_DATA='\Animation; 100 frames; B/W bitmap'
                         ALT_TEXT='African Elephant Family Animation'

ALT_TEXT2='Video not available'

:LDESC ID=eleph_sound    OBJTYPE=audio                              ← 140

OBJECT='trumpet.aud'
                         STORE=internal
                         DATA='audio.exe \ DeltaMod File Format B'
                         RUNTEXT='Listen to the Elephant Trumpet'

AUTOLAUNCH=no

ALT_TEXT2='Audio not available'

:LDESC ID=pop_graphic    OBJTYPE=graphic                            ← 150

OBJECT='population.gph'
                         STORE=internal
                         DATA='graph.exe \ GOCA Format C'

AUTOLAUNCH=yes
                         VIEW=bottom
                         STYLE=2

ALT_TEXT2='Graphics not available'
```

:H1.AFRICAN WILDLIFE.

160

:P.Studies have been conducted over the last decade on the changing populations of wildlife around the world. Inroads made by civilization have drastically reduced the habitats for indigenous species. A typical population undergoing such changes is that of the elephant.

162

:L LID=eleph_movie.Motion Picture of African Elephant family:eL.

164

:P.The elephant is an endangered species. The members of the family Elephantidae are indigenous to both Asia and Africa. The African elephant is tall, large-eared mammal of tropical Africa. The Indian elephant is a relatively small-eared mammal of the forests of southeast Asia. Listen to the sound of an elephant's trumpet.

166

:L LID=eleph_sound.Audio 1 - Elephant's Trumpet:eL.

168

:P.Several international organizations have focused attention on the plight of the world's elephant populations.

170

:L LID=pop_graphic.Figure 1: Worldwide Elephant Population:eL.

172

:P.The graph in Figure 1, produced by the Serengeti Foundation of Tanzania, is based on their comprehensive surveys of wildlife parks and zoos around the world. The graph shows the growth of zoo populations for the elephant compared to the growth of wild populations in Asia and Africa.

OBJECT='family_clip.vid'     195     CD Video File Format A

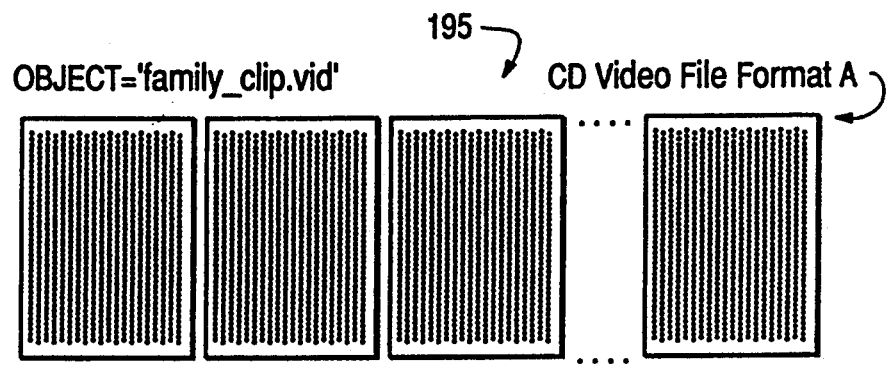

FIG. 1e

OBJECT='population.gph'     Graphic Data 190     110

ID  element (Row 1, Col 1) to (Row 2, Col 2)

E01 Horizontal Size (5700)
E02 Vertical Size (1300)
E03 Vector (300,500) to (1100,500)
E04 Vertical String (300,300) "Elephants"
E05 Box (800,700) to (1100,900)
E06 Horizontal String (700,700) "Asia"
E07 Vector (1100,500) to (1100,3400)
E08 Box (600,1600) to (1100,1800)
E09 Horizontal String (500,1400) "Africa"
E10 Box (300,2700) to (1100,2900)
E11 Horizontal String (200,2600) "Zoos"
E12 Horizontal String (1200,600) "Figure 1: Worldwide Elephant Population"
E13 Horizontal String (300,3900) "Data:"
E14 Horizontal String (400,3900) "Serengeti"
E15 Horizontal String (500,3900) "Foundation"
E16 Horizontal String (600,3900) "Survey"

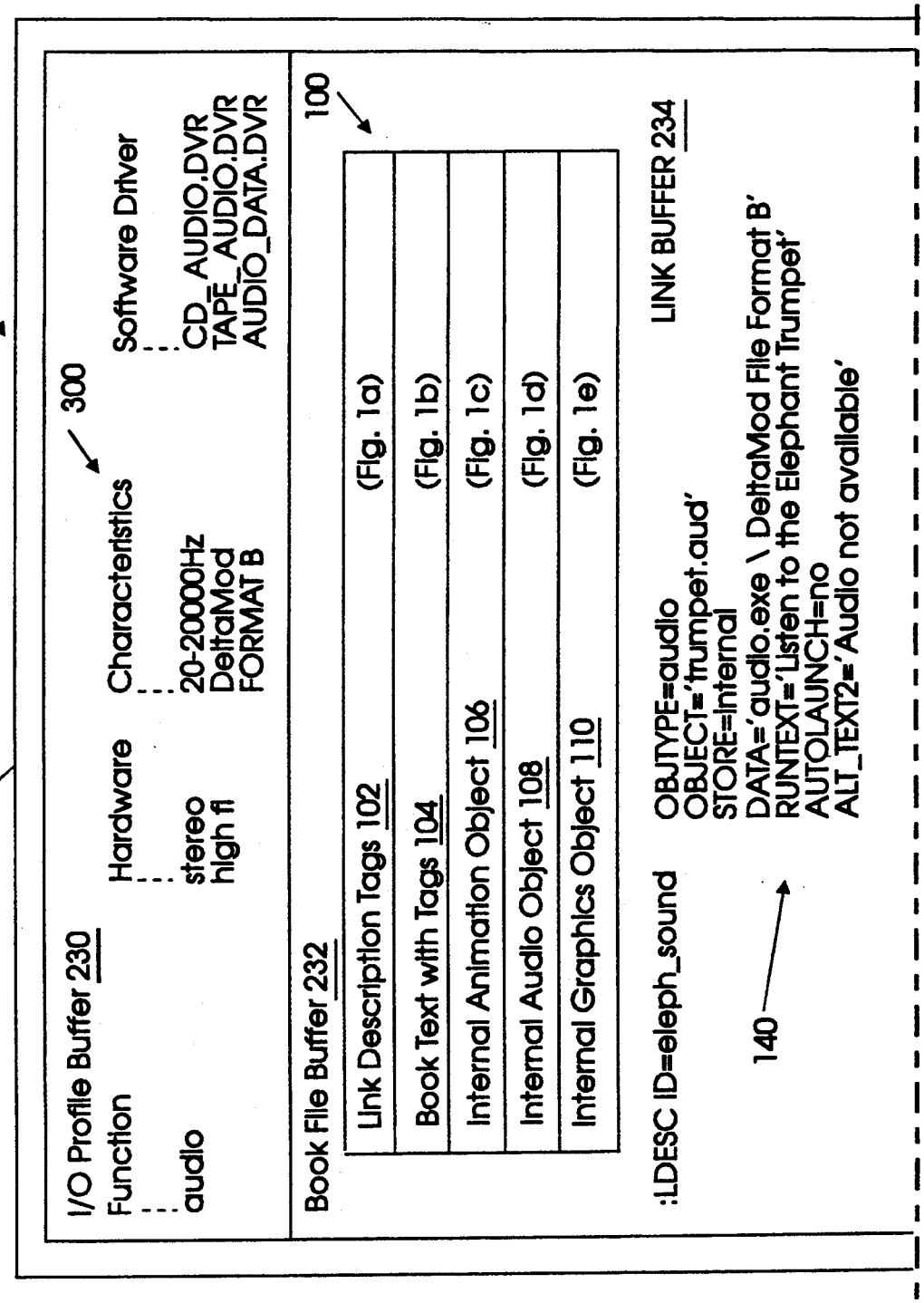

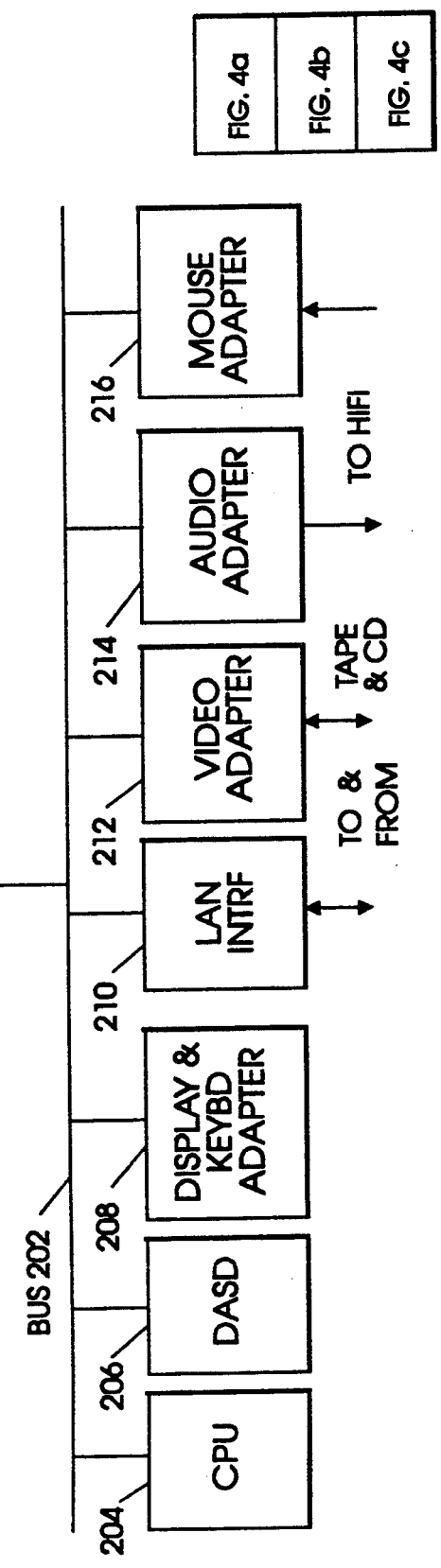

FIG. 5

| I/O FUNCTION | HARDWARE TYPES | CHARACTERISTICS | SOFTWARE DRIVERS |
|---|---|---|---|
| keyboard | std | std | BIOS |
| pointer device | mouse | .050 | MOUSE.DVR |
|  | touch overlay | stylus .050<br>finger .500 | OVRLAY.DVR<br>GESTURE.DVR |
| display | high res | 1000x1000<br>256 colors<br>GOCA<br>FORMAT C | BIOS<br>ANIMATION.DVR<br>GRAPHICS.DVR |
| disk store | hard drive | 100 MB | BIOS |
| printer | laser | 300 dpi | PRINTER.DVR |
| audio | stereo<br>high fi | 20-20000 Hz<br>DeltaMod<br>FORMAT B | CD_AUDIO.DVR<br>TAPE_AUDIO.DVR<br>AUDIO_DATA.DVR |
| video | VHS Tape | Read/Write | VHS_TAPE.DVR<br>VHS_DATA.DVR |
| video | Compact Disc | CD Video<br>FORMAT A<br>Read/Write | CD_VIDEO.DVR<br>VIDEO_DATA.DVR |

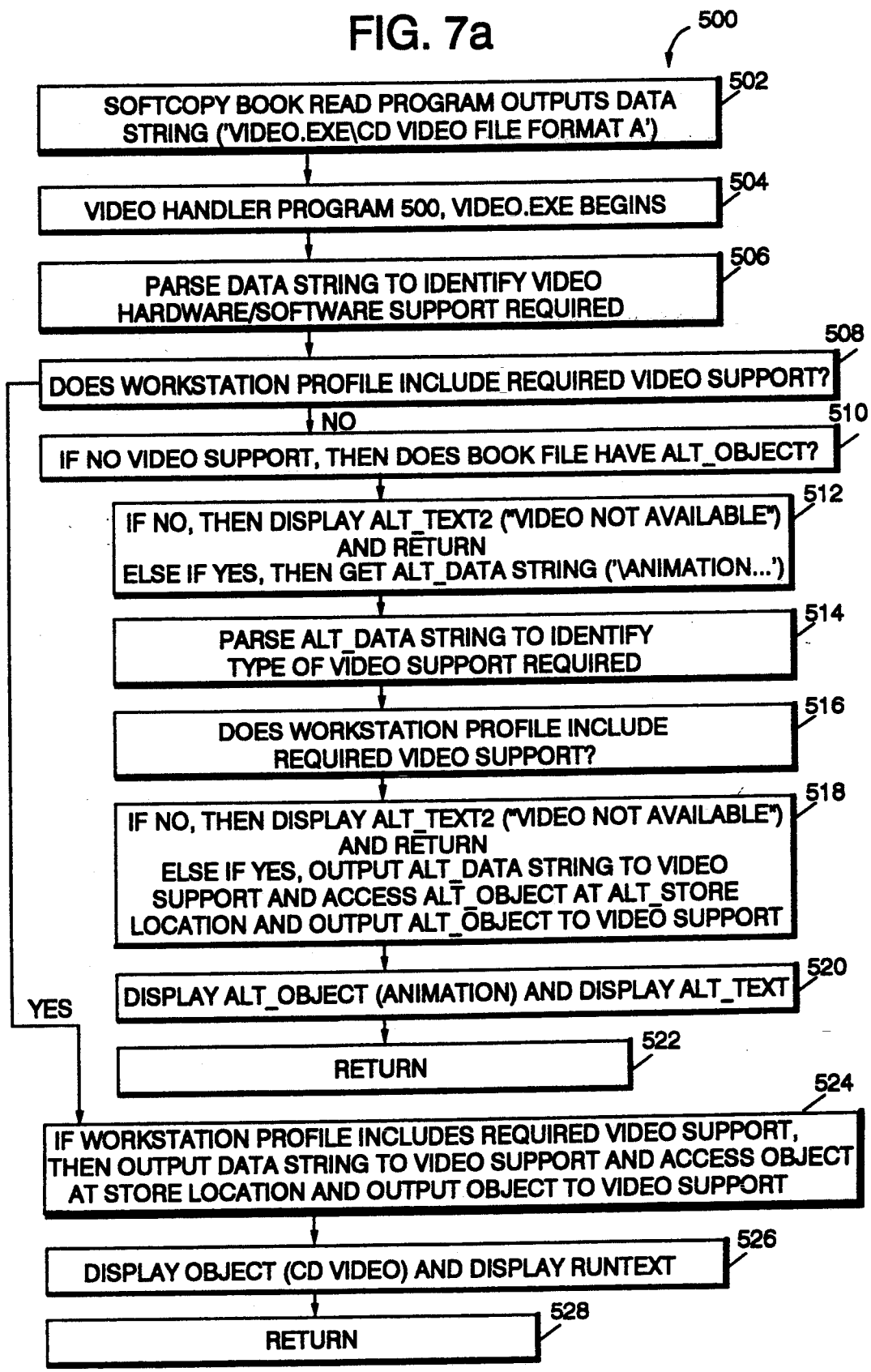

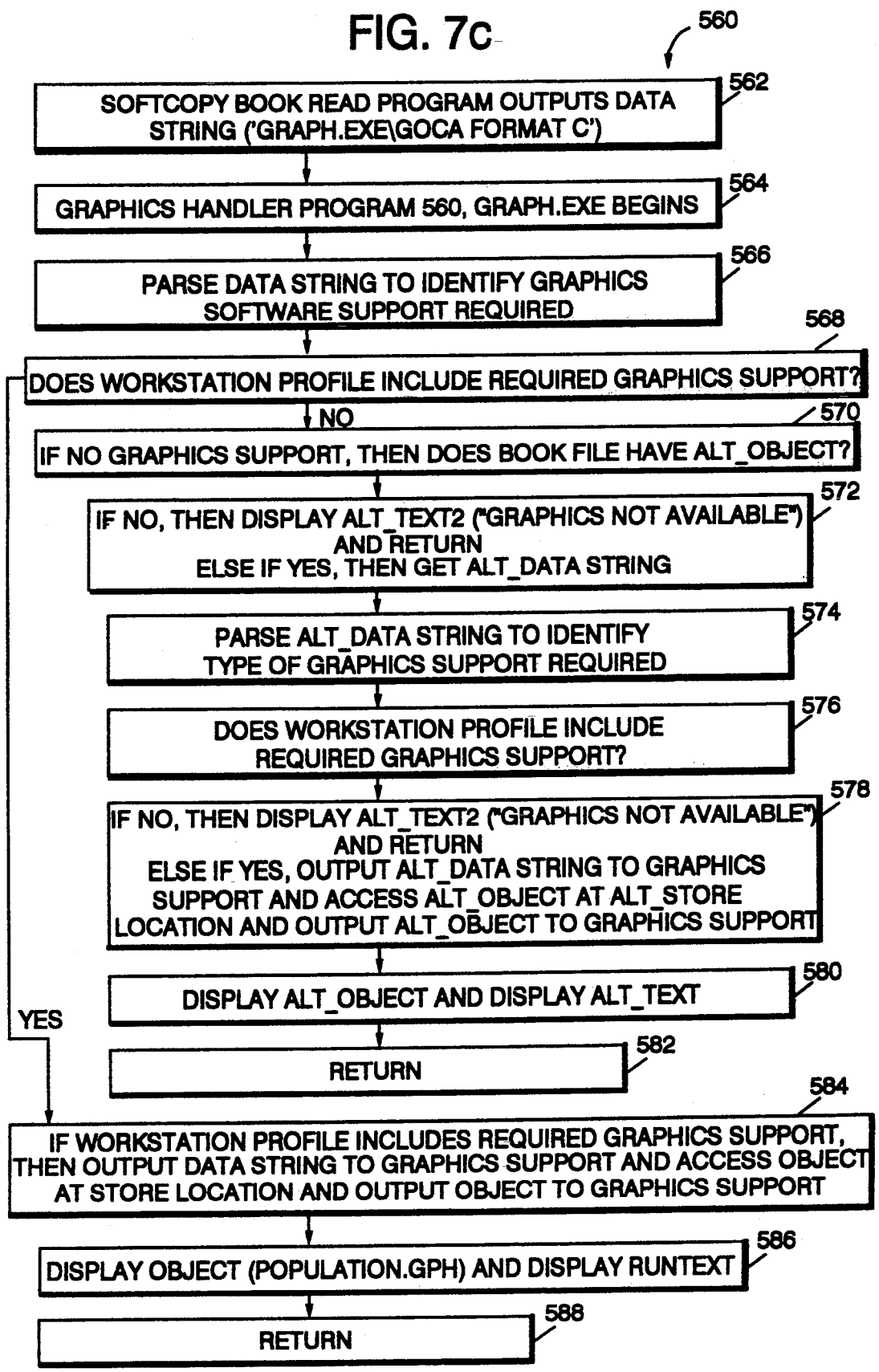

| File Index 105 | object name | offset value |
|---|---|---|
| Link Description Tags | 'ldesc_table' | 013A |
| Book Text with Tags | 'book_text' | 05B3 |
| Int' Animation Object | 'family_clip.anm' | 3000 |
| Int' Audio Object | 'trumpet.aud' | 4000 |
| Int' Graphics Object | 'population.gph' | 5000 |
| added → Int' 2nd Ed. Animation Object | 'family_2nd.anm' ← new name | 6000 |

Link Description Tags 102
:LDESC ID=eleph_movie OBJTYPE=video
    OBJECT='family_clip.vid'
    STORE=external
    DATA='video.exe \ CD VIDEO File Format A'
    RUNTEXT='African Elephant Family Video'
    AUTOLAUNCH=no
    VIEW=center
    STYLE=2
changed →   ALT_OBJECT='family_2nd.anm' ← new name
    ALT_STORE=internal
optional change → ALT_DATA='\ Animation; 150 frames; B/W bitmap'
optional change → ALT_TEXT='New African Elephant Family Animation'
    ALT_TEXT2='Video not available'
    :

| Book Text with Tags 104 | (Fig. 1b) | |
|---|---|---|
| Internal Animation Object 106 | (Fig. 1c) | (100 frames) |
| Internal Audio Object 108 | (Fig. 1d) | |
| Internal Graphics Object 110 | (Fig. 1e) | |
| added → Internal 2nd Edition Animation Object 115 | | (150 frames) |

| File Index 105 | object name | offset value | |
|---|---|---|---|
| Link Description Tags | 'ldesc_table' | 013A | same name |
| Book Text with Tags | 'book_text' | 05B3 | |
| Int' 2nd Ed. Animation Object | 'family_clip.anm' | 3000 | |
| Int' Audio Object | 'trumpet.aud' | 4500 | |
| Int' Graphics Object | 'population.gph' | 5500 | |

Link Description Tags 102
:LDESC ID=eleph_movie OBJTYPE=video
    OBJECT='family_clip.vid'
    STORE=external
    DATA='video.exe \ CD VIDEO File Format A'
    RUNTEXT='African Elephant Family Video'
    AUTOLAUNCH=no
    VIEW=center
    STYLE=2 no change → ALT_OBJECT='family_clip.anm'
    ALT_STORE=internal
optional change → ALT_DATA='\ Animation; 150 frames; B/W bitmap'
optional change → ALT_TEXT='New African Elephant Family Animation'
    ALT_TEXT2='Video not available'
    :

120

| Book Text with Tags 104 | (Fig. 1b) |
|---|---|
| sub-stituted → Internal 2nd Edition Animation Object 115 | (150 frames) |
| Internal Audio Object 108 | (Fig. 1d) |
| Internal Graphics Object 110 | (Fig. 1e) |

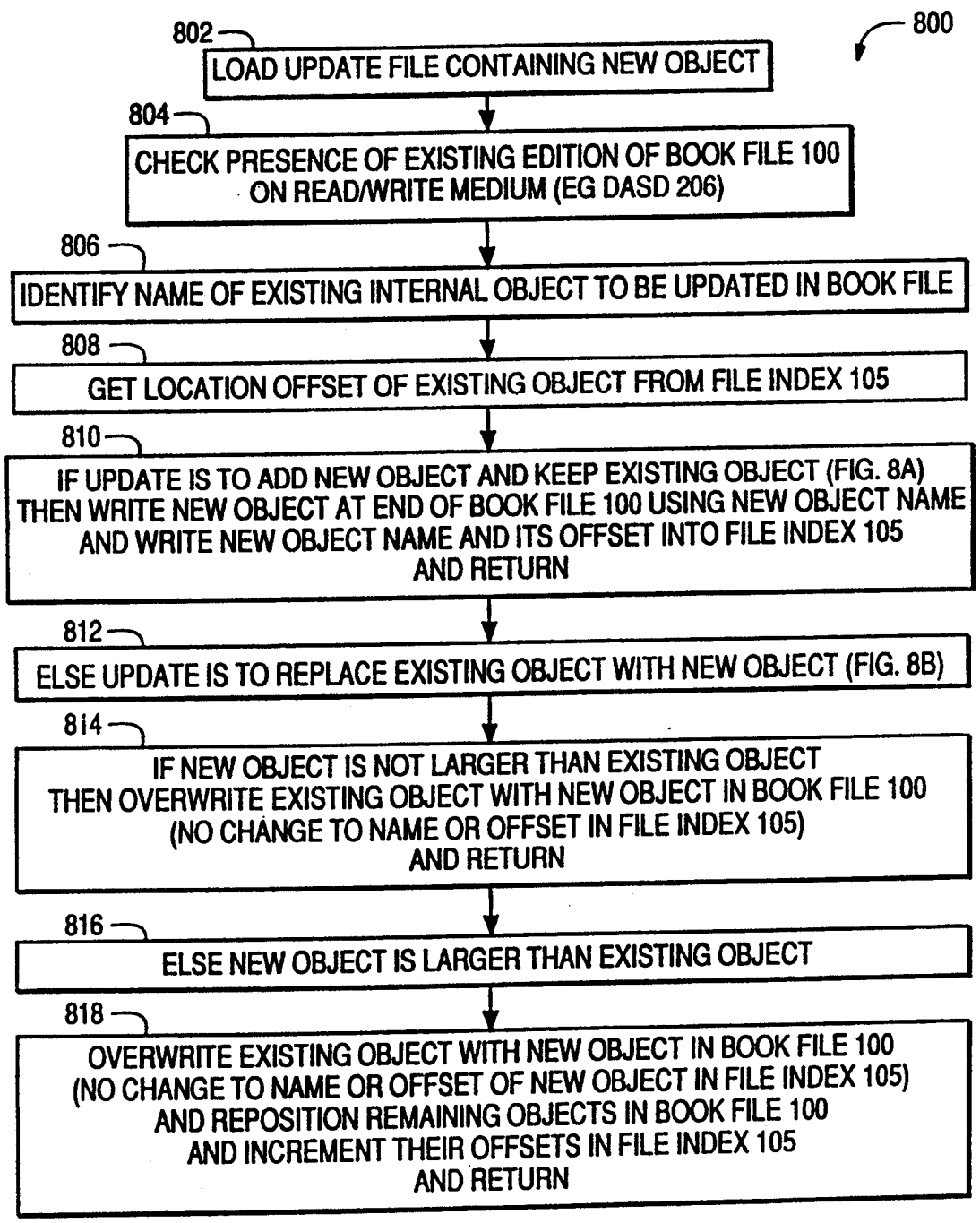

DATA PROCESSING METHOD TO PROVIDE A GENERALIZED LINK FROM A REFERENCE POINT IN AN ON-LINE BOOK TO AN ARBITRARY MULTIMEDIA OBJECT WHICH CAN BE DYNAMICALLY UPDATED

BACKGROUND OF THE INVENTION

1. Technical Field

The invention disclosed broadly relates to data processing and more particularly relates to the display of multimedia presentations from an on-line book.

2. Background Art

Large, softcopy documents have been stored in data processing systems for later retrieval and display. The retrieval of documents using a computer has been a prominent application in both business and library science. However, the presentation of large, softcopy documents for display on a monitor screen, has been in a serial, page-by-page format. The page-by-page presentation has made the on-line review of large, softcopy documents a slow and inefficient operation. To solve this problem of page-by-page presentation, softcopy book reading programs have been devised. For example, the IBM BookManager (TM) READ program helps the user manage, search and look at on-line books. There are two complementary BookManager products, BookManager BUILD creates on-line books from files marked-up with Generalized Markup Language. The BookManager READ product can then manage, search and show the on-line books created by BookManager BUILD. The BookManager READ program product is described in the IBM publication "BookManager (TM) READ, Displaying On-Line Books," publication number SC23-0449-0, February 1989. The BookManager BUILD program product is described in the IBM publication "BookManager (TM) BUILD—Preparing On-Line Books," publication number SC23-0450-0, February 1989. These books are available from IBM branch offices.

Conventional softcopy book reading programs typically display the pages of the softcopy book on a conventional monitor display screen. Multimedia presentation formats such as audio presentation., video presentation, sequential image animation presentation, and the like have not been considered a part of the presentation format which can be included and displayed in softcopy on-line books. Among the problems confronting the prior art which have prohibited the provision of multimedia presentation from on-line books is the lack of standardization in multimedia output devices and software drivers. This is due in part to the rapid rate of development of new multimedia output devices and it is further due in part to a lack of organized standards in the industry.

OBJECTS OF THE INVENTION

It is therefore an object of the invention to provide an improved softcopy book reading method.

It is another object of the invention to provide an improved softcopy book reading method capable of multimedia presentations.

It is still a further object of the invention to provide an improved softcopy book reading method which provides generalized links to arbitrary multimedia objects.

It is still a further object to provide an improved softcopy book reading method wherein the nature, representation and presentation of multimedia objects are not constrained by the mechanism that invokes the link from the book to the object.

It is a further object of the invention to provide an improved softcopy book reading method which enables the easy updating of multimedia objects contained in the book, to new editions.

SUMMARY OF THE INVENTION

These and other objects, features and advantages are provided by the invention disclosed herein. A method, program and data processing system are disclosed, for providing a generalized link from a reference point within an organized hierarchy of a formatted text stream in an on-line book, to an arbitrary type multimedia object. The method begins by storing a formatted text stream in the data processing system. The formatted text stream includes a link description which contains multimedia type information, object location information and multimedia control information for a target multimedia object. The formatted text stream further includes a link tag associated with the link description, which identifies a source location in the formatted text stream from which a link is established to the target multimedia object.

The method continues by storing the multimedia object in the data processing system at a location identified by the location information, the object including multimedia data representing a multimedia presentation. The method then continues by storing a multimedia handler program in the data processing system, the handler program controlling operations of a multimedia output device characterized by the multimedia type information.

The method then continues by displaying the formatted text stream in the data processing system. The method then continues by activating the link tag in the data processing system and in response thereto, transferring from the link description to the multimedia handler program the multimedia control information. The method then continues by executing the multimedia handler program using the control information and in response thereto, transferring from the location identified by the location information to the multimedia output device, the multimedia data from the multimedia object. The method concludes by producing the multimedia presentation with the multimedia output device using the multimedia data from the multimedia object.

Multimedia objects may be represented by data separate from the book or they may be encapsulated within the book. A description of the link is encoded in the softcopy book, which includes information about the type and location of the multimedia object to be referenced, and which includes multimedia control information. The softcopy book reading program embodying the method, invokes the appropriate multimedia handler program to support the presentation of the multimedia object. The nature, representation and presentation of the multimedia object are not constrained by the mechanism that invokes the link.

Many different kinds of multimedia objects can be linked into a softcopy book. Multimedia objects such as high resolution, photographic quality graphics, motion video, or sound can be supported by the invention. In addition, other functions which can be included in an expanded definition of multimedia, can also be presented, such as a spread sheet, or an engineering diagram using a computer aided design data base.

The author of a softcopy book can specify several types of multimedia presentation and the method of the invention selects the type which is compatible with the hardware available in the workstation where the book is read.

An additional feature of the invention is the ability to dynamically update the softcopy book to new editions with new multimedia presentations.

The resulting data processing method provides a generalized link from a reference point in a softcopy, on-line book to an arbitrary multimedia object, which accommodates a variety of multimedia hardware and updating of books to new editions.

BRIEF DESCRIPTION OF THE DRAWINGS

These and other objects, features and advantages will be more fully appreciated with reference to the accompanying figures.

FIG. 1 is an organizational diagram of a softcopy book file 100.

FIG. 1a illustrates the link description tags 102 in the softcopy book file of FIG. 1.

FIG. 1b illustrates the softcopy book text with tags 104 in the softcopy book file of FIG. 1.

FIG. 1c illustrates the internal animation object 106 in the softcopy book file of FIG. 1.

FIG. 1d illustrates the internal audio object 108 in the softcopy book file of FIG. 1.

FIG. 1e illustrates the internal graphics object 110 in the softcopy book file of FIG. 1.

FIG. 2 illustrates the external video object 195.

FIG. 5 illustrates a user's workstation profile which characterizes the workstation of FIG. 4.

FIG. 7a illustrates an example video handler program in accordance with the invention.

FIG. 7c illustrates a flow diagram of a graphics handler program in accordance with the invention.

FIG. 8a illustrates the softcopy book file 100' with the addition of a new internal object.

FIG. 8b illustrates the softcopy book file 100" with the substitution of a new internal object.

FIG. 8c illustrates a flow diagram of a method for updating the book file to a new edition.

DESCRIPTION OF THE PREFERRED EMBODIMENT

Figure 3A:
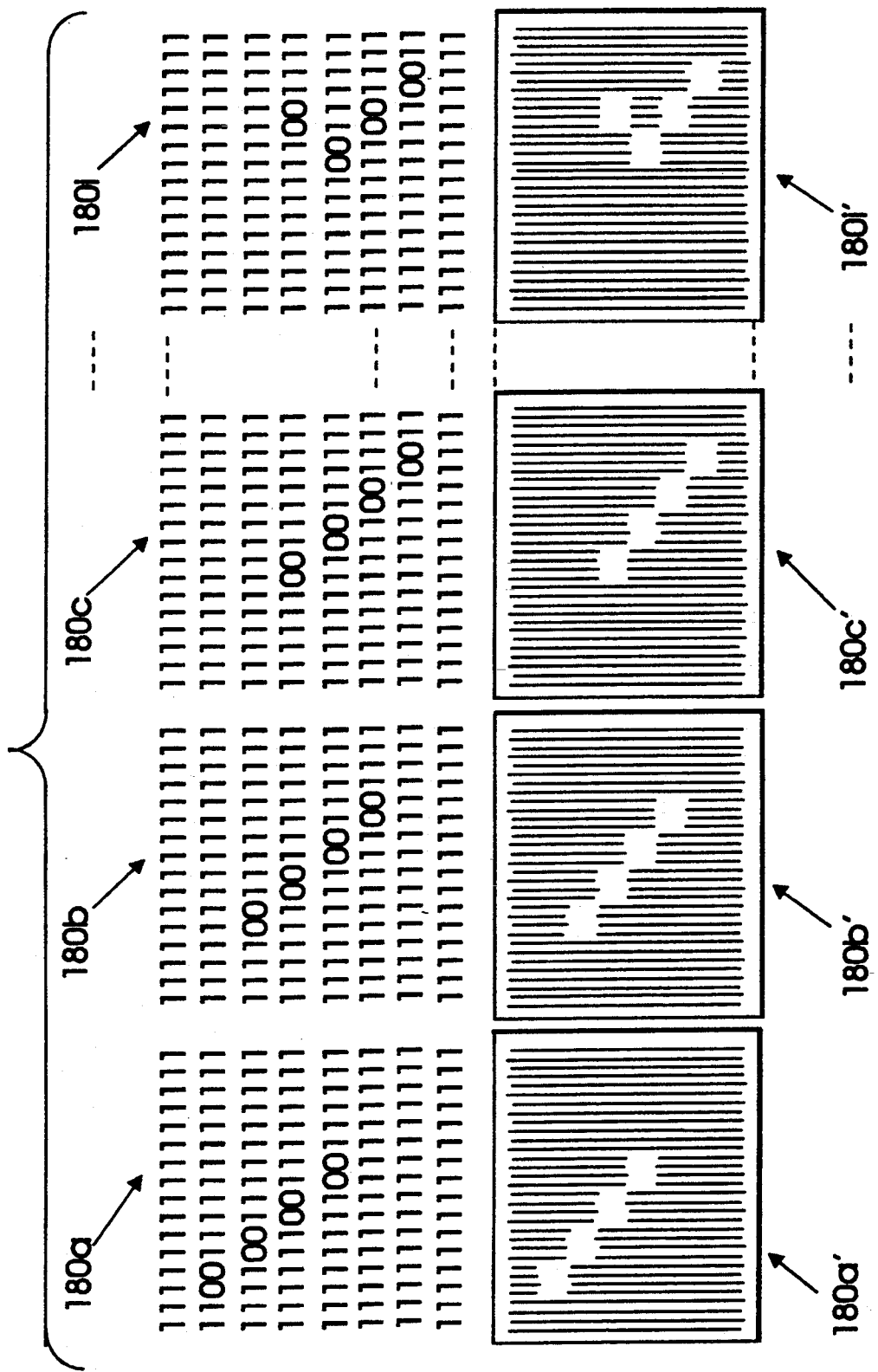
FIG. 3a illustrates the relationship between the bit mapped frames in an animation sequence format and the corresponding displayed appearance of the frames.

The above referenced IBM publications describing BookManager BUILD and BookManager READ program products, describe the principles of operation of a softcopy book reading program whose presentation format primarily displays on a monitor display screen. Additional background description of the BookManager product can be found in the following IBM patent applications:

Abandoned U.S. patent application Ser. No. 317,248, filed Feb. 20, 1989, entitled "A Method for Displaying On-Line Information," by E. Cassorla, et al., assigned to the IBM Corporation and incorporated herein by reference.

Copending U.S. patent application Ser. No. 486,461, filed Feb. 28, 1990 entitled "a Method for Associating Annotation With Electronic Books," by J. DeVries, et al., assigned to the IBM Corporation and incorporated herein by reference.

Copending U.S. patent application Ser. No. 546,334, filed Jun. 29, 1990, entitled "Structured Document Tags Invoking Specialized Functions," by N. Sabia, et al., assigned to the IBM Corporation and incorporated herein by reference.

The BookManager BUILD and BookManager READ program products use on-line, softcopy books which are formatted using the Generalized Markup Language (GML) described in the following two IBM publications:

"IBM BookMaster—Text Programmers Notebook—Release 3.0," publication number SC34-5012-02, September 1990 and "IBM BookMaster—Users Guide—Release 3.0," publication number SC34-5009-03, September 1990. Both of these IBM BookMaster publications are available through IBM branch offices.

An understanding of the invention disclosed herein requires a basic knowledge of the concept of hypertext links. The link tags described herein specify hypertext links which are created within on-line documents and between on-line documents. Using the GML described in the above referenced BookMaster publications, new tags and concepts described herein enable the creation of hypertext links within and between on-line documents. In accordance with the invention disclosed herein, those hypertext links are improved to represent and present multimedia objects in a manner which is not constrained by any mechanism which invokes the link.

Hypertext links connect elements in one part of an on-line document to elements in another part of the same document or in a separate on-line document or in an external file or data base. Links can be thought of as similar to cross-references in a printed document. For example, while reading about a topic in an encyclopedia, the reader may come across a reference to another topic. The reader of the hardcopy book will place a finger on the page that references the topic and will turn back to the new referenced page. The reader has just created a link from one part of the hardcopy document to another.

In printed documents, a reader turns to related information. In an on-line softcopy document, the BookManager program creates a link to related information, and the on-line reader can then display that information. The way a reader selects a reference for BookManager to display can be by using a pointing device such as a mouse to activate a link tag in the displayed text. A previously stored address pointer relates the link tag to the target portion of the document to which the link tag refers. The target may also be another document.

An author-defined link is created by the book's author to establish a relationship between a source location within the softcopy text and a target location within the same text or the text in another softcopy book. The author will place a link tag in the location of the softcopy book which is the source or referencing location. Then the author will include a link description tag at the beginning of the softcopy book, which describes the information necessary to create a link from the source link tag to the target location.

The BookMaster tags are improved upon, in accordance with the invention, to provide a new multimedia link description tag LDESC in the prologue of the document, which is defined as follows:

```
:LDESC
    ID=name
    DOCID=name
    OBJECT=object-name
    OBJTYPE=object-type
    DATA='string'
    AUTOLAUNCH=YES/NO/seconds/
    'lid + nnnnn'
    VIEW=FULL/TOP/MID/BOT/CENTER/
    RIGHT/LEFT/
    /TOPR/TOPL/MIDL/MIDC/MIDR/
    BOTL/BOTR/REPLACE
    STYLE=0/1/2/3/4
    ALTTEXT='string'
    STORE=INTERNAL/EXTERNAL
    RUNTEXT='string'
    ALT-OBJECT=object-name
    ALT-STORE=INTERNAL/EXTERNAL
    ALT-DATA='string'
    ALT-TEXT2='string'
```

The new LDESC tag describes the multimedia object the author wants BookManager to create a link to, where:

ID=name
Specifies the name to be used for references to the LDESC tag. This attribute is required.
DOCID=name
For interdocument links, refers to the DOCDESC of the document the author wants to link to.
Note: This attribute is not used for intradocument links. It is only necessary to identify a link from the author's document to another document.
OBJECT=object-name
Refers to the first, primary multimedia element the author wants to create a link to. The object-name is the name of the multimedia element (for example, the name of a video, audio or animation object).
OBJTYPE=object-type
Identifies the type of information the author wants to create a link to. The object-type can be one of the following values:
PROGRAM/ANIMATION/VIDEO/AUDIO/-GRAPHIC/IMAGE
Multimedia information. Access to these types of information depends on the capabilities of the user's installation.
'OTHER category'
OTHER is for future categories of multimedia objects. Values for category depend on the capabilities of the user's installation.
HEAD
A section with a heading, as defined by BookMaster heading tags or heading equivalents. If the OBJTYPE attribute is omitted, HEAD is assumed.
BOOK
For interdocument links, an entire book. Here the DOCID is used instead of the OBJECT attribute to tell BookManager what link to create. This value is not used for intradocument links.
FIG/TABLE/QUES/ANS
A figure, table, question, or answer.
STEP/CI/LI/SPOT
A step, component item, list item, or spot.
DATA='string'
Lets the author pass data to multimedia object handler programs for the first, primary element. For example, string may be parameters to create a link to an animation sequence. Values for string depend on the capabilities of the user's installation.
AUTOLAUNCH
Defines how to invoke or launch the multimedia link.
YES
Automatically launch link first time page appears.
NO
Launch link only upon explicit selection. seconds
Launch link nnn seconds after screen display. linkid+nnnn
Launch link nnn seconds after a certain link (also associated with this spot) is invoked.
VIEW
Where to put the new link. The positioning is the same as the VIEW attribute of the :SCREEN tag with the addition of REPLACE.
REPLACE
Use the same space as the link for the application window.
STYLE=0/1/2/3/4
What style to show the link.
0 Invisible
1 Highlight
2 Frame Type 1
3 Frame Type 2
4 Pushbutton
ALTTEXT
Text to provide if first, primary element's link cannot be traversed.
STORE
Store first, primary link object internally or externally from book file.
RUNTEXT
Optional text to provide during presentation of first, primary element.
ALT-OBJECT=name
Refers to the alternate multimedia element the author wants to create a link to if the first, primary multimedia object is not available. Air-Object-name is the name of the alternate element (for example, the name of an alternate video, audio, or animation object).
ALT-STORE
Store alternate link object internally or externally from book file.
ALT-DATA='string'
Lets the author pass data to multimedia object handler programs for the alternate element. For example, string may be parameters to create a link to an animation sequence. Values for string depend on the capabilities of the user's installation.
ALT-TEXT2='string'
Text to provide if both the primary and the alternate inks cannot be traversed.

The BookMaster GML tag set also includes the link tag :L. The link tag is used to specify a word or phrase that the author wishes to create a source link from. The link tag and the LID attribute identifies the link descriptor LDESC tag that specifies a link. The link tag L does not generate any text for on-line documents.

The link L tag and its attribute are:
:L LID=name
where:
LID=name

Refers to the link descriptor tag LDESC that is to be associated with the word or phrase associated with the link tag :L and its end tag :eL. Multiple LID values can be specified. The text enclosed by the link tag :L and its end tag eL can include other tags and link tags can be nested.

Author-defined interdocument links are links which the author may specify between documents. They are specified with the same tags used for other types of links:

DOCDESC is the document descriptor tag in the prologue of the document which the author uses to create a link from, and it identifies the document that contains the information the author wishes to create a link to.

LDESC is the link tag which identifies the information that the author wishes to create a link to that follows the DOCDESC tag in the prologue of the softcopy document, and must have a DOCID attribute that points to the DOCDESC tag.

The link tag :L and its matching end tag :eL enclose a word or phrase in the body of the document that the author wants to create a link from. The LID attribute refers to one or more LDESC document link tags.

Figures 1, 1C, 1D:
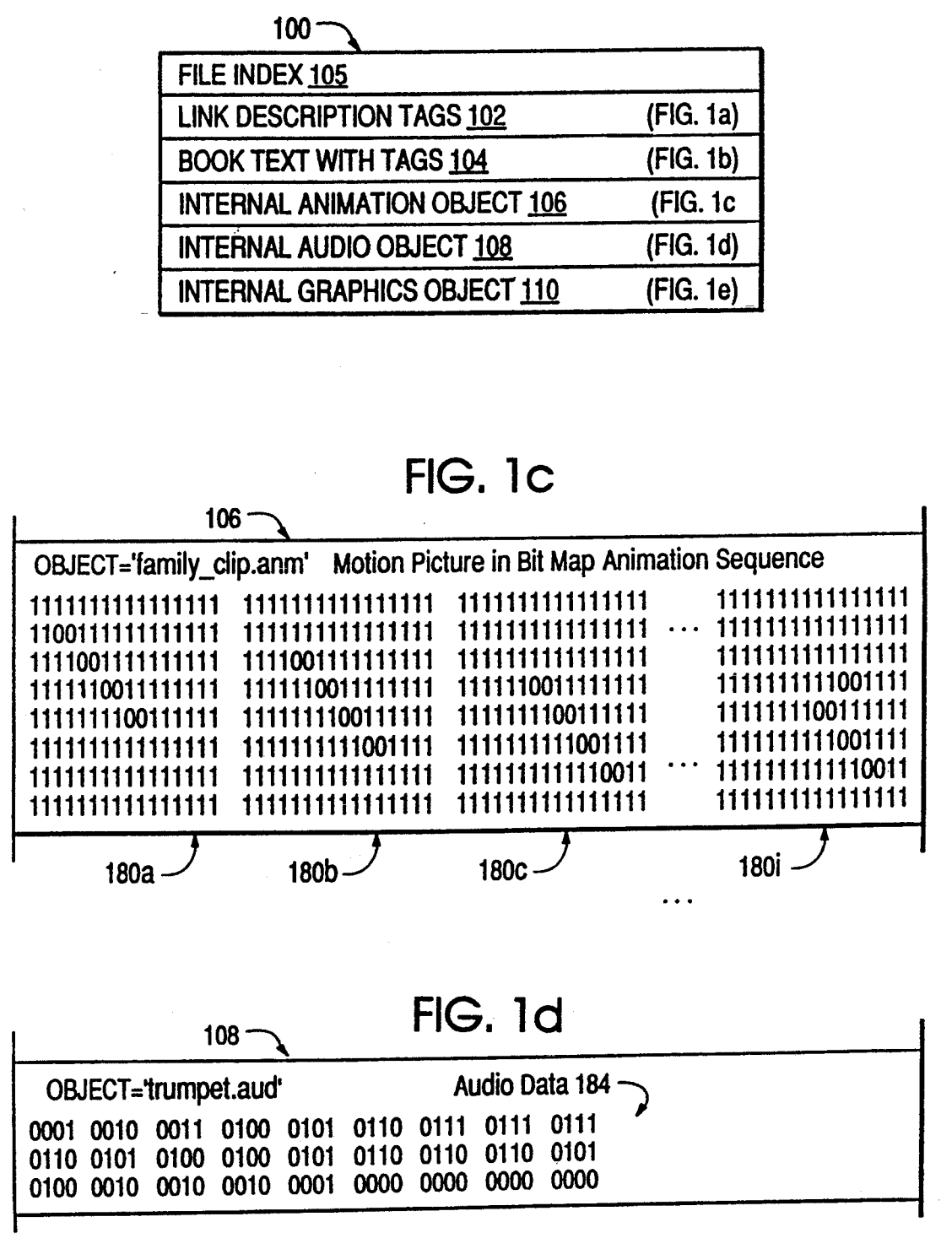

Turning now to FIG. 1, the softcopy book file 100 is shown which includes the link description tags 102 shown in greater detail in FIG. 1a, the book text with tags 104 shown in greater detail in FIG. 1b, the internal animation object 106 shown in greater detail in FIG. 1c, the internal audio object 108 shown in greater detail in FIG. 1d, and the internal graphics object 110 shown in greater detail in FIG. 1e. The location of the link descriptor tags, book text and internal objects is identified in the file index 105 which stores the location offset values for each in the book file 100.

In FIG. 1a, the link description tags 102 include three tags. A first tag 120 for a video object type, a second tag 140 for an audio object type, and a third tag 150 for a graphic object type.

FIG. 1b shows the book text with tags 104. The softcopy book text includes a first portion 160 which is a heading denoted by :H1. The second section 162 is a paragraph denoted by :P.

The third section 164 is a multimedia hypertext link denoted by the beginning tag :L and the ending tag :eL. The link identification LID=eleph_movie for the link 164, relates the tag 164 to the link descriptor tag 120 of FIG. 1a.

Continuing in FIG. 1b, the portion 166 is a paragraph, as denoted by the tag :P. The portion 168 is another hypertext multimedia link, as denoted by the begin tag :L and the end tag :eL. The link identifier LID=eleph_sound for the link 168, relates it to the link descriptor tag 140 in FIG. 1a.

In FIG. 1b, the portion 170 is a paragraph as denoted by the tag :P. The portion 172 is another hypertext multimedia link, as denoted by the begin tag :L and the corresponding end tag :eL. The link identification LID-pop_graphic for the link 172 relates it to the link descriptor tag 150 in FIG. 1a.

Returning to the softcopy book text of FIG. 1b, the portion 174 is a paragraph as denoted by the tag :P.

FIG. 1c shows an internal animation object 106 which is a sequence of 100 individual bit maps 180, 180a, 180b, 180c, through 180i. The internal animation object 106 has an object name 'family_clip.anm' and represents a motion picture in a bit map animation sequence, of an African elephant family.

FIG. 1d is an internal audio object 108 which includes the audio data 184. The object has the name 'trumpet.aud'. FIG. 1e is an internal graphics object 110 which includes the graphic data 190. The object 110 has an object name 'population.gph'.

FIG. 2 shows an external video object 195, which can be a compact disk (CD) video file in a standard format referred to as Format A. The external video object 195 can represent an African elephant family in a raster video format. The softcopy book file 100 of FIG. 1 can be stored on a magnetic diskette on the DASD 206 or it can be stored on a compact disk as a separate file from the external video object 195 which would be stored as its own file on the same compact disk. Alternately, the external video object 195 can be stored in another storage medium separate from that for the softcopy book file 100. If the video object 195 of FIG. 2 were an internal object, it would be encapsulated as a part of the softcopy book file 100, in a manner similar to the incorporation of internal object 106, 108 or 110 in FIG. 1.

FIG. 3a shows the bit map frames in animation sequence format for the internal animation object 106 of FIG. 1c. FIG. 3a shows the relationship between each respective bit mapped frame 180a, for example, and its corresponding displayed appearance 180a' as it would be displayed on a monitor display screen. The displayed appearances 180a', 180b', 180c' through 180i' correspond respectively to the bit maps 180a, 180b, 180c through 180i in FIG. 3a.

Figure 3B:
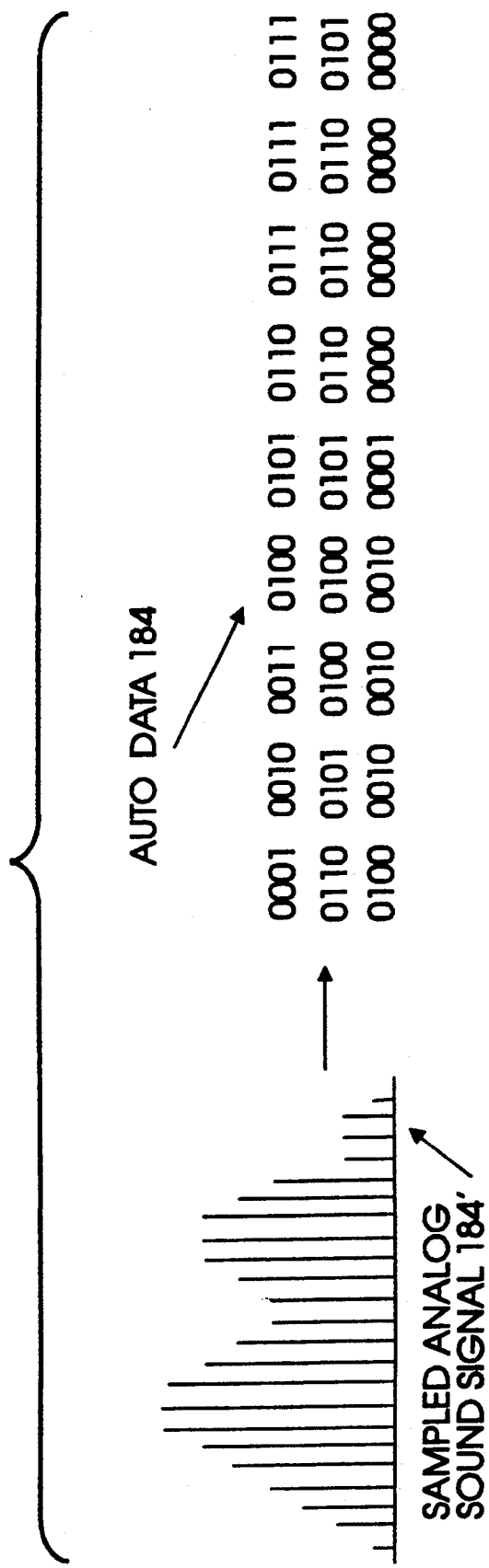
FIG. 3b illustrates how a sampled analog sound signal is converted into audio data for an audio object.

FIG. 3b shows an example of how the I/O data 184 in the internal audio object 108 of FIG. 1d, can be generated from a sampled analog sound signal 184'. The example shown in FIG. 3b makes use of simple pulse height modulation to characterize each sampled analog amplitude in a signal 184' as a one out of 16 value, represented as a four binary bit expression in the audio data 184. A digitized value of each sample of the sound signal can then be stored as the audio data 184 in the internal audio object 108 of FIG. 1d.

Figure 3C:
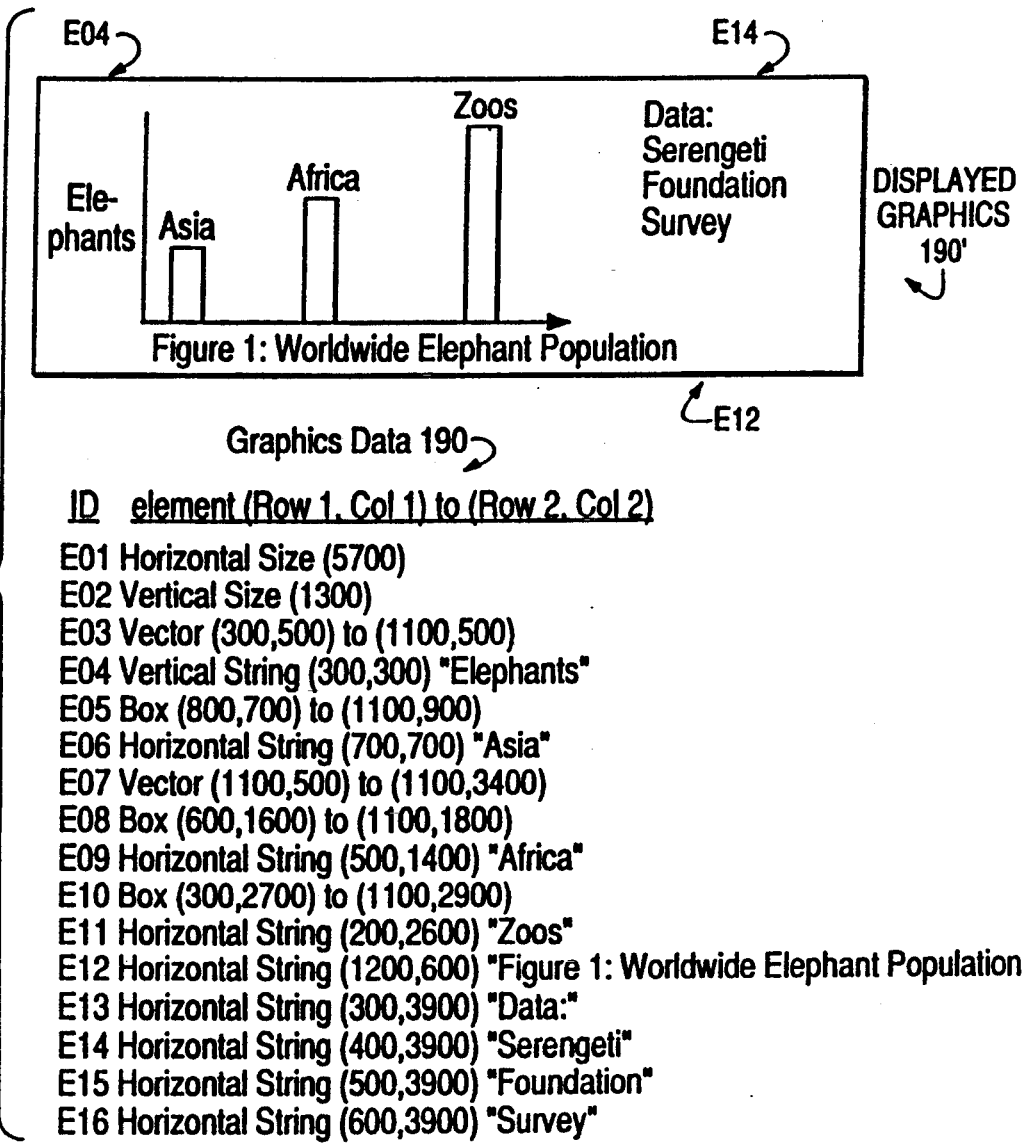
FIG. 3c illustrates the relationship between displayed graphics and the graphics data which generates the display.

FIG. 3c shows the relationship between the displayed graphics 190' and the graphics data 190 which represents the displayed graphic 190'. The graphics 190 is contained in the internal graphics object 110 of FIG. 1e. The displayed graphics 190' of FIG. 3c shows a graph with vertical and horizontal lines, vertical bars, and alphanumeric strings E04, E14, and E12, for example. The graphics data 190 is one example of the representation of shapes by geometric elements expressed as standard shapes and located at points on a Cartesian coordinate system. One standard for the representation of graphics objects is by the graphics object content architecture (GOCA) which is described in the IBM publication SC31-6804, which is available from IBM branch offices.

Figure 4B:
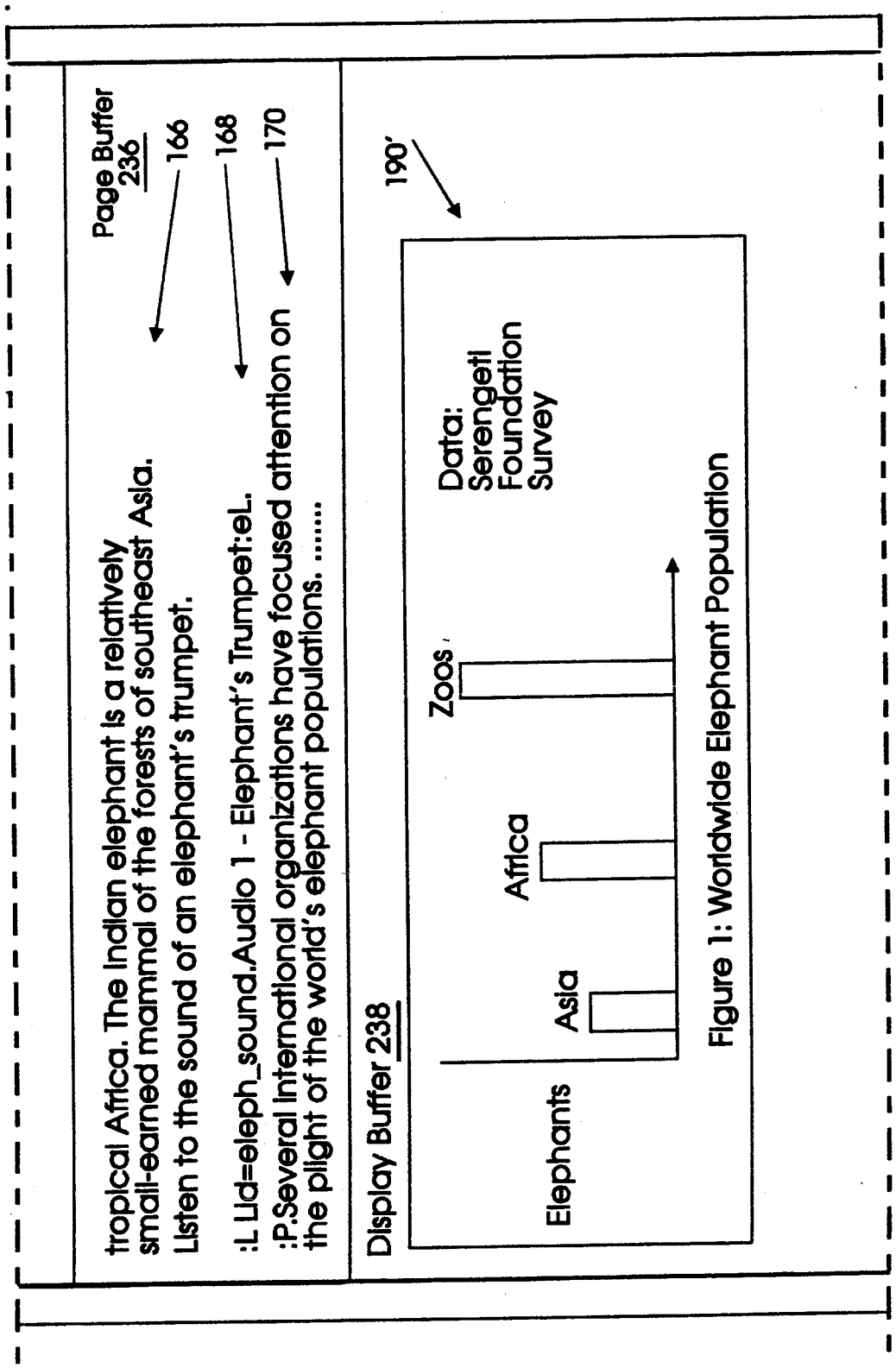
FIG. 4 is an architectural diagram of an example workstation for displaying a softcopy book using the method of invention.

FIG. 4 illustrates a workstation for displaying a softcopy book, in accordance with the invention. The workstation 200 includes the bus 202 which interconnects the CPU 204, DASD 206, display and keyboard adapter 208, local area network (LAN) 210, video adapter 212, audio adapter 214, mouse adapter 216, and the memory 220. The video adapter 212 can be connected to a video storage device such as a compact disk or a video tape device which can be both written to as well as read from. The audio adapter 214 can be connected to a high fidelity sound reproduction device. The memory 220 includes an I/O profile buffer 230, a book file buffer 232, a link buffer 234, a page buffer 236, and a display buffer 238. Also stored in the memory 220 is the softcopy book READ program 400 of FIG. 6, the I/O handler programs 500, 530 and 560 of FIGS. 7a, 7b and 7c, respectively, and the drivers and operating system 590. The CPU 204 of FIG. 4, executes the instructions embodied in the program 400 and in the handler programs 500, 530 and 560, in accordance with the invention.

The I/O profile buffer 230 in the memory 220, stores the user's workstation profile 300 shown in FIG. 5. The book file buffer 232 stores the softcopy book file 100 which includes the link description 102, the book text with tags 104, the internal animation object 106, the internal audio object 108, and the internal graphics object 110. The link buffer 234 stores the link description tags 102 of FIG. 1a. The page buffer 236 stores the page of book text 104 shown in FIG. 1b. The display buffer 238 stores the resulting picture displayed on the monitor display screen 208. Currently, the graphics 190' and the text 174' are shown in the display buffer 238 of FIG. 4.

The softcopy book file 100 can be downloaded from a host through the LAN interface 210 to the workstation 200, or alternately it can be loaded from a diskette on the DASD 206. Alternately, if the video adapter 212 is connected to a compact disk player, the book file 100 can be read from the compact disk player through the adapter 212.

It is within the scope of the invention that the architecture of FIG. 4 can represent a host data processing system or alternately a self-contained, portable data processor such as a laptop or palm top personal computer.

FIG. 5 depicts the user's workstation profile 300, which characterizes the input and output devices which are available to the workstation 200 in FIG. 4. The profile 300 includes the hardware types for a particular I/O function, characteristics for each hardware type, and the software drivers which enable the application programs and I/O handler programs to interact with the particular I/O hardware or software. For example, if the I/O function is audio, the user's workstation profile 300 shows that there is a stereo high fi connected through the audio adapter 214 to the workstation 200. The workstation profile 300 further describes that the stereo high fi hardware has, among its other characteristics, a frequency response of 20 to 20000 Hertz and it can handle delta mod data in FORMAT B. Still further, the workstation file 300 shows that there are three software drivers available for producing an audio output. The first software driver is "CD_AUDIO.DVR" which is a software driver which enables an audio object stored on a compact disk player which may be connected through the video adapter 212, for example, to transfer the audio data from the audio object to the stereo high fi to produce the audio presentation. The second software driver for the audio I/O function is "TAPE_AUDIO.DVR." This audio driver enables an audio object stored on a tape drive, such as can be connected through a suitable adapter to the bus 202, to output audio data from the audio object stored thereon to the stereo high fi for the audio presentation. The third software driver for the audio I/O function is "AUDIO_DATA.DVR." This driver enables an audio object such as the internal audio object 108 in FIG. 1b, to have its audio data transferred to the stereo high fi hardware for the audio presentation. The workstation profile 300 provides similar types of information for a variety of multimedia hardware which may be connected to the workstation 200, for respective multimedia presentations from multimedia objects linked from the softcopy book text 104 of FIG. 1b. The profile can be changed as multimedia hardware and drivers are changed.

Figure 6:
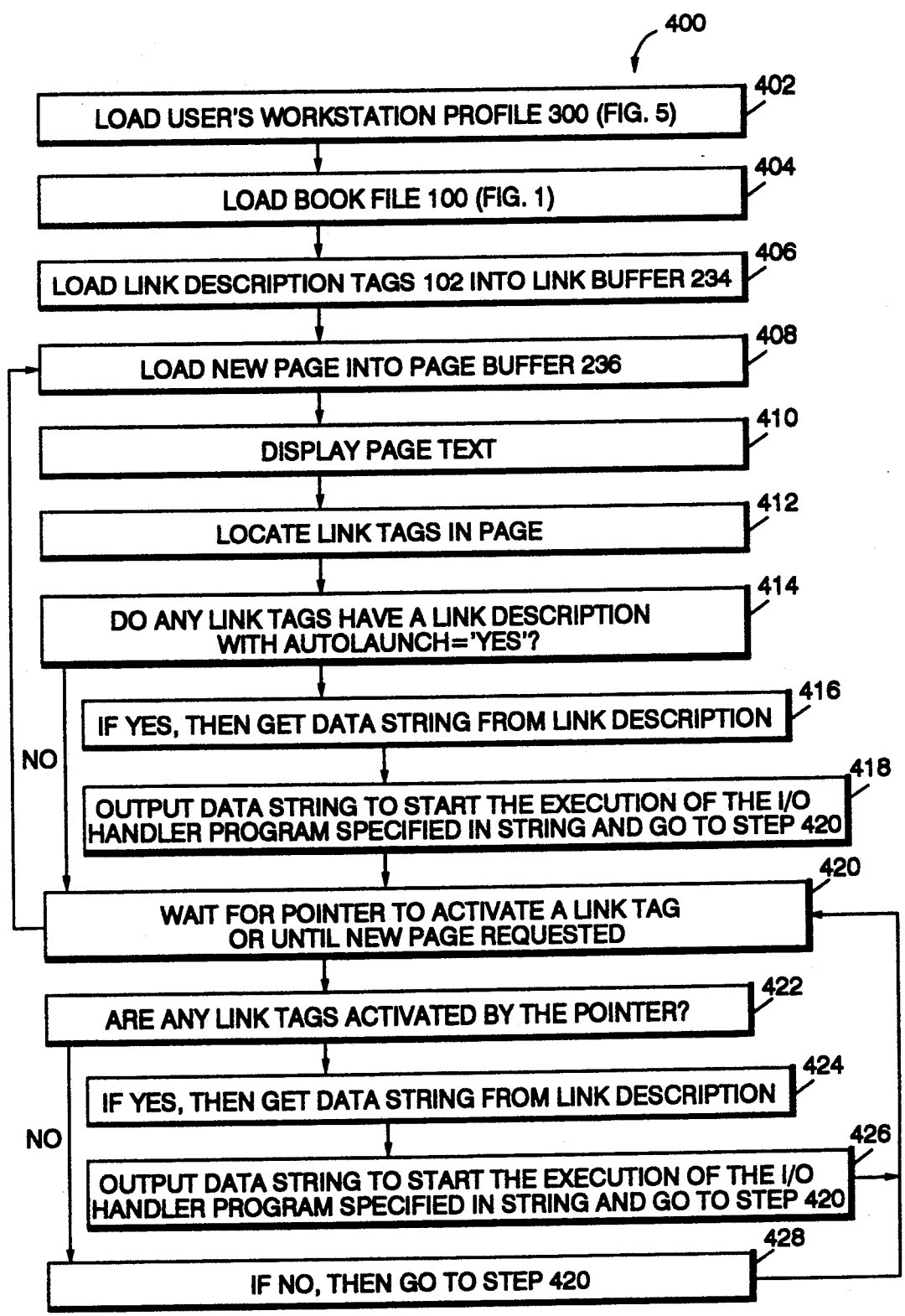
FIG. 6 illustrates a flow diagram of the softcopy book READ program in accordance with the method of the invention.

FIG. 6 is a flow diagram of the softcopy book READ program 400, in accordance with the invention. The program resides in a partition of the memory 220 of the workstation in FIG. 4, or alternately in the memory of a host processor in a host data processing system. The program 400 of FIG. 6 begins with step 402 which loads the user's workstation profile 300, shown in FIG. 5. The profile is loaded into the I/O profile buffer 230 of the memory 220. Then in step 404, the book file 100 of FIG. 1 is loaded into the book file buffer 232 of the memory 220. Then in step 406, the link description tags 102 of FIG. 1a are loaded into the link buffer 234 of the memory 220. Then in step 408, a new page from the softcopy book text 104 in FIG. 1b is loaded, into the page buffer 236 of the memory 220. This begins a loop which extends from step 408 down through step 420. In step 410, the page of text from the softcopy book is displayed on the display 208. The softcopy book READ program 400 operates on the book text and its tags in the page buffer 236 and constructs the memory image of the picture to be displayed, which is stored in the display buffer 238 of the memory 220. In step 412, the link tags are located in the softcopy book text. In particular, the link tags 164, 168 and 172 in the book text of FIG. 1b are located. Then in step 414, a determination is made as to whether any link tags have a link description with the AUTOLAUNCH parameter equaling "yes" in the corresponding link descriptor tag. Reference to the link description tag 102 in FIG. 1a will show that the first link description tag 120 has AUTOLAUNCH equal to no, the second link tag 140 has AUTOLAUNCH equal to no. However, the third link tag 150 has AUTOLAUNCH equal to yes. The link descriptor tag 150 is for a graphic object type, and refers to the internal graphics object 110 of FIG. 1e. In step 416 of FIG. 6, if an AUTOLAUNCH parameter is equal to "yes," then the program gets the DATA string from the link description. Reference to FIG. 1a will show that the link description tag 150 has the DATA='graph.exe \ GOCA Format C'. Then in step 418 of FIG. 6, the program outputs the data string to start the execution of the I/O handler program specified in the string. This is followed by the step 418 going to step 420. With reference to the graphic object type link descriptor 150 of FIG. 1a, the string 'graph.exe \ GOCA Format C' is output by the softcopy book READ program 400 to begin execution of the specified I/O handler program, namely graph.exe, whose flow diagram is shown in FIG. 7c. A discussion of the graphics handler program of FIG. 7c will take place below.

The softcopy book READ program of the flow diagram of FIG. 6 proceeds to step 420, which waits for the mouse pointer to activate a link tag in the displayed portion of the softcopy book, or alternately until a new page is requested by the user. If a new page is requested, the flow proceeds back to step 408. However, if the mouse pointer or other pointing device activates a link tag, such as the link tag 164 of the book text of FIG. 1b, then the program proceeds to step 422 which confirms that there are link tags activated by the pointer. Then in step 424, since link tags have been confirmed as having been activated by the pointer, the softcopy book READ program 400 gets the DATA string from the corresponding link descriptor in the link buffer 234, as depicted in FIG. 1a. In the case of the mouse pointer activating the link 164 of the book text of FIG. 1b, the link ID for link 164 is LID=eleph_movie, which is the link ID specified by the link descriptor tag 120 of FIG. 1a. The data for the link descriptor tag 120 is 'video.exe CD Video File Format A'. Step 424 of the flow diagram of FIG. 6 gets that DATA string and outputs it in step 426 to start the execution of the I/O handler program specified in the string. Then step 426 goes to step 420. The string 'video.exe CD Video File Format A' specifies the I/O handler program video.exe, whose flow diagram is shown in FIG. 7a. A discussion of the video handler program of FIG. 7a will be conducted below.

After the completion of the I/O handler program whose execution was started as a result of step 426 of the flow diagram of FIG. 6, the flow proceeds back to step 420 to wait for another mouse pointer to activate a link tag or alternately to wait until a new page is requested by the user. In step 428, if there is no pointer activation or new tag requested, then the flow continues to loop back to step 420.

The video handler program whose flow diagram is shown in FIG. 7a, will now be described. In step 502, the softcopy book READ program 400 outputs the DATA string, and this step 502 corresponds to either step 418 or step 426 of the softcopy book READ program 400 of FIG. 6. In the example of activating the link tag 164 in the softcopy book text 104 of FIG. 1b, this is the link to initiate the multimedia video display of a motion picture of an African elephant family. As was previously described, the softcopy book READ program 400 outputs the DATA string 'video.exe \ CD Video File Format A' and the specification of the video handler program name video.exe begins the video handler program 500 in step 504 of FIG. 7a. The video handler program then commences with step 506 to parse the DATA string to identify the video hardware/software support required by the author of the book text 104. At the time the author wrote the softcopy book, he had in mind the use of multimedia displays to amplify the descriptions in this text. The author in this case has chosen a video display of an African elephant family to provide a motion picture presentation, which is stored outside of the book file 100. The author recognized that not all user workstations will include a video display capability, and therefore the author provided an alternate motion picture option which will be a sequential bit map animation display, which is stored internally within the book file 100, and which will be described below. For the video display chosen by the author to accompany his softcopy book text, the author chose a compact disk (CD) video with a file format of A. This specification is included in the DATA string provided in the link descriptor 120 of FIG. 1a. It will be recalled that in step 402 of the flow diagram of FIG. 6, the user's workstation profile 300 in FIG. 5 was loaded into the I/O profile buffer 230. Examination of the profile 300 in FIG. 5 will show that the workstation 200 in FIG. 4 includes a compact disk video playing capability which includes the playing characteristics of CD video Format A. In step 508 of the video handler program of FIG. 7a, it is determined whether the workstation profile includes the required video support. Since the profile 300 indicates that the support is present in the workstation 200, the flow proceeds to step 524 which outputs the DATA string 'CD Video File Format A' and other control information necessary for the playing of the video information from the compact disk player which is connected through the video adapter 212 to the workstation and the presentation of the resulting motion picture on the display 208 at the workstation. Step 524 accesses the necessary data from the external video object 195 of FIG. 2 as specified by the object name 'family_clip.vid', which is the file handle for the video object 195 on the compact disk device, and the STORE=external parameters in the link descriptor 120 of FIG. 1a. The data from the object is transferred to the software driver CD_VIDEO.DVR, specified in the workstation profile 300, and the software driver controls the presentation of the motion picture received from the video adapter 212 for display on the display 208. Step 526 of FIG. 7a displays the CD video on the display 208. In addition, a text defined by the author can also be displayed at this time, as is specified by the RUNTEXT parameter in the link descriptor 120. In this case, the link descriptor provides RUNTEXT='African elephant family video' and this string will also be displayed at the time the video is displayed on the display 208.

In accordance with the invention, if the workstation 200 does not have a compact disk video display capability either because it does not have the adequate hardware or the hardware does not have the author's specified characteristics or alternately if the software drivers are not adequate for providing video display presentations, then the video handler program of FIG. 7a proceeds from the determination step 508 to step 510 where it has been determined that there is no video support at this workstation. It is then determined whether the book file 100 has provided an alternate object to be displayed. The link descriptor 120 is examined to determine if the parameter ALT_OBJECT is present. If the author has provided an alternate object to be presented instead of the video display, then that alternate object will be identified as is shown in FIG. 1a as ALT_OBJECT='family_clip.anm', which is the name of the alternate to be displayed. Link descriptor 120 also provides ALT_STORE=internal, which indicates that the alternate object is stored within the book file 100, at a location specified by the file index 105. In step 512 of the flow diagram of FIG. 7a, if there is no alternate object provided in the link descriptor 120, then an alternate text ALT_TEXT2 is displayed, which is provided in link descriptor 120 as ALT_TEXT2='Video not available'. Then the flow diagram returns to the main program. However, in step 512, if there is an alternate object, as is the case for link descriptor 120, then the ALT_DATA string is accessed from the link descriptor, in this case the string '\Animation; 100 frees; B/W bit map' is accessed and parsed to identify the type of video support required. Then in step 516, it is determined that the workstation profile includes the required video support. In step 518, if there is no support, then the alternate text ALT_TEXT2 is displayed which is 'Video not available' and the program returns to the main program. However, in step 518 if the workstation does include the required video support, then the video handler program outputs the ALT_DATA string to the video support and it accesses the ALT_OBJECT specified in the link descriptor 120, at the ALT_STORE=internal location which is the offset value stored in the file index 105. In this case, the ALT_OBJECT is the internal animation object 106 which is stored as a part of the book file 100 and which is shown in FIG. 1c. The ALT_OBJECT data is then output to the video support and in step 520, the animation for the ALT_OBJECT is displayed. In addition, any alternate text specified by the parameter ALT_TEXT in the link descriptor 120, is also displayed at that time. In this case, ALT_TEXT='African Elephant Family Animation' is displayed. Then in step 522, the flow returns to the main program. In this manner, the author can provide for alternate forms of hardware and software multimedia presentations at the time he writes his softcopy book, and the user at the workstation can enjoy an animated presentation in either a video format or an animation format, depending on the I/O support available at his workstation.

Figure 7B:
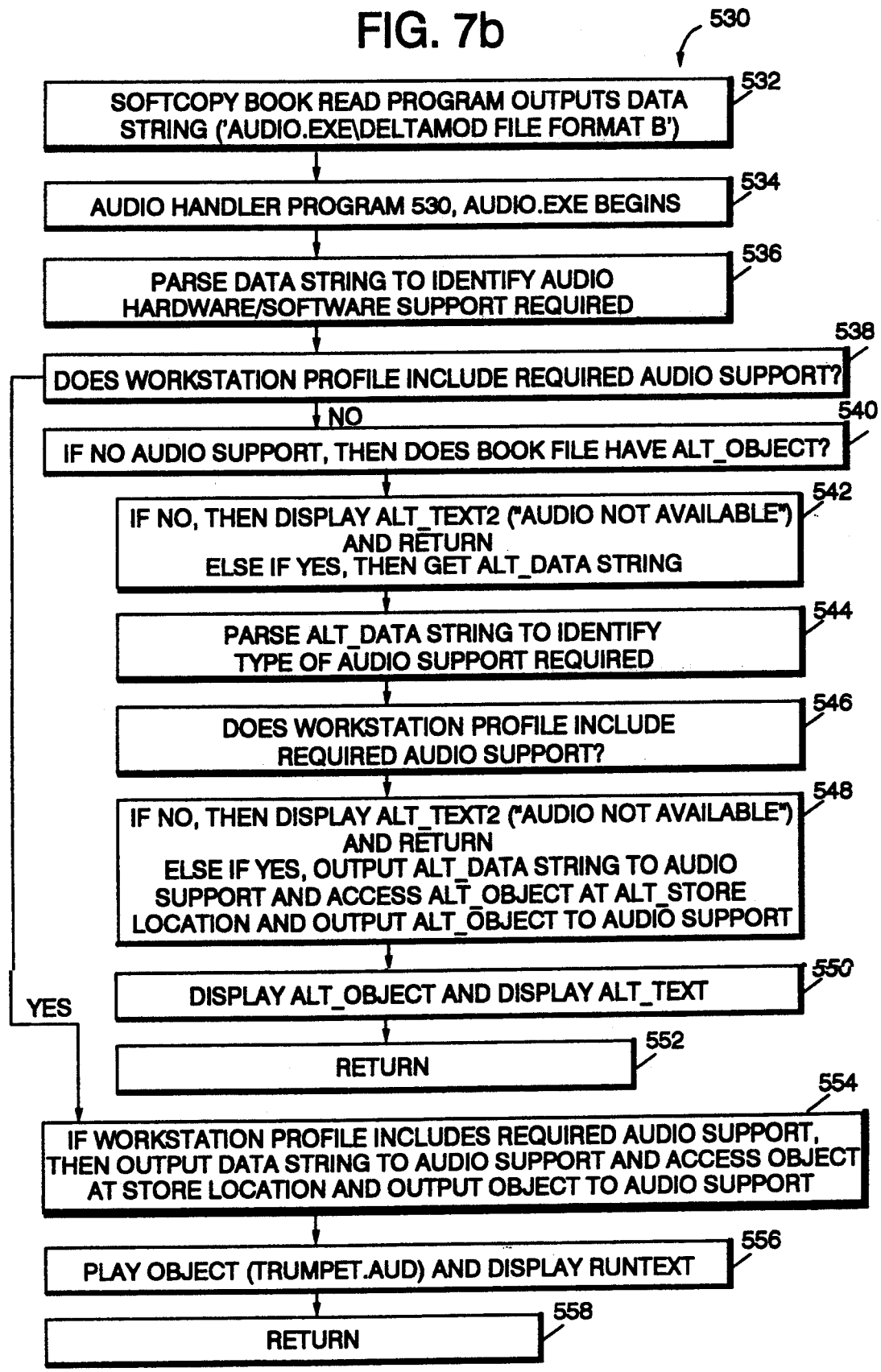
FIG. 7b illustrates a flow diagram of an audio handler program in accordance with the invention.

FIG. 7b shows the audio handler program flow diagram 530, which has a similar organization to the video handler program of FIG. 7a. Step 532 corresponds to step 418 or step 426 of the softcopy book READ program of FIG. 6. In step 534, the audio handler program 530, audio.exe begins, in response to outputting the DATA string from the audio link descriptor 140 of FIG. 1a. Then in step 536, the DATA string is parsed to identify if the required audio hardware and software support is present in the workstation. In step 538, if the workstation profile includes the required audio support, then the flow proceeds to step 554 and the DATA string for the audio support is output and the OBJECT specified in the link descriptor 140 is accessed at the STORE=internal location which is the offset value of the object, stored in the file index 105. Audio data form the object is output to the audio support. Then in step 556, the object, which in this case is an elephant trumpet sound in the object 108, trumpet.aud is played by a high fidelity audio reproduction system connected to the audio adapter 214. At this time a RUNTEXT can also be displayed. Then in step 558, the program returns to the main program. If in step 538 it is determined that the audio support specified by the author in the data descriptor 140 of FIG. 1a is not present in this workstation, then it is determined in step 540 if there is an alternate object. If there is, then the alternate object is handled in a manner similar to that described for the video handler program, using steps 542, 544, 546, 548, 550 and 552. However, if there is no alternate object, then the ALT_TEXT2 string 'Audio not available' is displayed.

In a similar manner, the graphics handler program of FIG. 1c provides for the display of graphics as specified by the link descriptor 150 in FIG. 1a. In the case of the link descriptor 150, since AUTOLAUNCH=YES, then as soon as the book text page 104 is displayed containing the link 172 which has the link ID=pop_graphic which is the link ID in the link descriptor 150, the link 172 is activated. The graphics handler program of FIG. 7c begins the program graph.exe in step 564 and the program steps 560 commence. In step 566, the data string is parsed to identify if the graphic software support specified by the author in the link descriptor 150, is present in this workstation. In this case, the required support is the GOCA Format C characteristic, which the workstation profile 300 indicates is present in the workstation 200. Therefore, the flow diagram of FIG. 7c proceeds from step 568 to step 584 and the object which is the internal graphics object 110 in FIG. 1e, which is a part of the book file 100, is accessed at its internal storage location as specified by the file index 105. The data in the object 110 is output to the appropriate graphics support software and the graphics is generated as is shown in FIG. 3c as the graphics 190' which is displayed on the display 208. In this case, the object named 'population.gph' is displayed. Also the associated RUNTEXT may be displayed. Then in step 588, the program returns to the main program.

In FIG. 5c, if there is no graphics support, then it is determined in step 570 if there is an ALT_OBJECT. If there is no ALT_OBJECT, then the ALT_TEXT2 is displayed, in this case 'Graphics not available'. Alternately, if there is an alternate object which the author has chosen to substitute where the graphics option is not available, then steps 574, 576, 578, 580 and 582 are executed in the flow diagram of FIG. 7c, in a manner similar to the alternate object handling for the video handler program of FIG. 7a.

Another feature of the invention is the ability to update internal objects stored inside the book file 100. This is an advantage, since a book file which contains all of the necessary multimedia objects as internal objects within the book, is a more portable unit than those softcopy books which require accessing other external multimedia objects. When the author originally wrote the softcopy book, he had in mind the use of certain specific multimedia objects and incorporated at least some of those multimedia objects as internal objects within the book. Later, when the author publishes a second edition of the book, some of the multimedia objects may be changed or new multimedia objects may be added to the second edition. One feature of the invention is the ability to add new multimedia objects or to substitute new objects for existing objects contained within the book file 100. Reference to FIG. 8a illustrates the addition of a new internal object to the softcopy book file 100'. The internal second edition animation object 115 is to be added to the book file 100, resulting in the updated book file 100'. This is accomplished by the method shown in the flow diagram of FIG. 8c. The method 800 starts with step 802 which loads the update file containing the new object 115. Then in step 804, the existing edition of the book file 100 is checked for its presence at the workstation and its location on a read/write medium such as the DASD 206. Then in step 806, the name of the existing internal object to be updated is identified in the book file. Then in step 808, the location offset is gotten for the existing object from the file index 105. Then in step 810, if the update is to add a new object and to keep the existing object such as is shown in FIG. 8a, then the new object is written at the end of the book file 100 using a new object name and the new object name is written into the file index 105 along with its new offset location. In order to enable the link description tags 102 to link to the new object 115, the link description tag 120 is changed by changing the ALT_OBJECT parameter to the new name 'family-2nd.anm'. In this manner, when the video handler program 500 of FIG. 7a accesses the alternate object in step 518, the newly added internal second edition animation object 115 will be accessed because that is the new alternate object name stored in the link description tag 120 of FIG. 8a.

Alternately, FIG. 8b shows the substitution of the new internal object into the softcopy book file 100". In the flow diagram of FIG. 8c, in step 812, if the update is to replace the existing object 106 with the new object 115, then step 814, if the new object 115 is not larger than the existing object 106, then the existing object is overwritten with the new object in the book file 100 and no change is made to the name or offset for the object in the file index 105. However, in step 816, if the new object 115 is larger than the existing object 106, which is the case for the example shown in FIG. 8b, then the existing object 106 is overwritten by the new object 115 in the book file 100 and no change is made to the name or the offset value for the new object in the file index 105. However, the remaining objects 108 and 110 which are internally stored in the book file 100", are repositioned in their location in the book file 100" and the offset value for their locations in the file index 105 is incremented by the difference in the size between the new object 115 and the existing object 106. The name of the alternate object ALT_OBJECT='Family-clip-anm' in the link description tag 120 of FIG. 8b, is not changed, since the new object replaces the old object. When the video handler program 500 of FIG. 7a accesses the alternate object in step 518, it will use the existing alternate object name in the link description tag 120 and the file index 105 will direct the accessing to the new internal object 115.

In this manner, when the author publishes updated editions to his softcopy book, which include additional or substitutional internal objects, the book file can be easily updated to the new edition by means of the method set forth in FIG. 8c.

The resulting invention provides a generalized link from a reference point within an organized hierarchy of text in a softcopy on-line book, to an arbitrary multimedia object which may be represented by data from an internal object within the softcopy book, or alternately from external files or external data bases. This enables multimedia objects such as high resolution photographic quality graphics, motion video, sound or animation to be supported, as specified by the author at the time of writing his book. The author may also provide for alternate multimedia objects to be displayed where particular specified multimedia hardware or software is not present in a user's workstation.

Although a specific embodiment of the invention has been disclosed, it will be understood by those having skill in the art that changes can be made to that specific embodiment without departing from the spirit and the scope of the invention.

What is claimed is:

1. A method in a data processing system including a processor, for providing a link from a reference point within a hierarchy of a formatted text stream in an on-line book, to a multimedia object, comprising the steps of:

storing a formatted text stream in said data processing system, said formatted text stream including a link description which includes multimedia device-type information, object location information and multimedia control information for a target multimedia object, said formatted text stream further including a link tag associated with said link description said tag identifying a source location in said formatted text stream from which a link is established to said target multimedia object;

storing said multimedia object in said data processing system at a location identified by said location information, said object including multimedia data representing a multimedia presentation;

storing a multimedia handler program in said data processing system, said processor controlling operations of a multimedia output device characterized by said multimedia device-type information, when said processor executes said handler program;

displaying said formatted text stream in said data processing system;

activating said link tag in said data processing system and in response thereto, transferring from said link description to said processor, said multimedia control information;

executing said multimedia handler program in said processor using said control information and in response thereto, transferring from said location identified by said location information to said multimedia output device, said multimedia data from said multimedia object;

producing said multimedia presentation with said multimedia output device in using said multimedia data from said multimedia object;

said link description includes a first object name, a first object location and first device control information for a first multimedia object and said link description further includes a second object name, a second object location and second device control information for a second device control information for a second multimedia object;

(a) determining with said processor executing said multimedia handler program whether said multimedia output device is capable of producing said multimedia presentation with said first multimedia object;

(b) producing said multimedia presentation with said multimedia output device using said multimedia data from said first multimedia object, upon determining that said multimedia output device is capable of producing said presentation;

(c) determining with said processor executing said multimedia handler program whether said multimedia output device is capable of producing said multimedia presentation with said second multimedia object upon determining that said multimedia output device is not capable of producing said presentation with said first object;

(d) producing said multimedia presentation with said multimedia output device using multimedia data from said second multimedia object upon determining that said multimedia output device is not capable of producing said presentation with said first object.

2. A method in a data processing system including a processor, for providing a link from a reference point within a hierarchy of a formatted text stream in an on-line book, to a multimedia object, comprising the steps of:

storing a formatted text stream in said data processing system, said formatted text stream including a link description which includes multimedia device-type information, object location information and multimedia control information for a target multimedia object, said formatted text stream further including a link tag associated with said link description said tag identifying a source location in said formatted text stream from which a link is established to said target multimedia object;

storing said multimedia object in said data processing system at a location identified by said location information, said object including multimedia data representing a multimedia presentation;

storing a multimedia handler program in said data processing system, said processor controlling operations of a multimedia output device characterized by said multimedia device-type information, when said processor executes said handler program;

displaying said formatted text stream in said data processing system;

activating said link tag in said data processing system and in response thereto, transferring from said link description to said processor, said multimedia control information;

executing said multimedia handler program in said processor using said control information and in response thereto, transferring from said location identified by said location information to said multimedia output device, said multimedia data from said multimedia object;

producing said multimedia presentation with said multimedia output device in using said multimedia data from said multimedia object;

storing an I/O support profile in said data processing system, specifying said multimedia output device which is coupled to said data processing system;

determining with said processor executing said multimedia handler program to determine whether said multimedia output device is capable of producing said multimedia presentation with said multimedia object;

producing said multimedia presentation with said multimedia output device using said multimedia data from said multimedia object, upon determining that said multimedia output device is capable of producing said presentation.

3. A method in a data processing system including a processor, for providing a link from a reference point within a hierarchy of a formatted text stream in an on-line book, to a multimedia object, comprising the steps of:

storing a formatted text stream in said data processing system, said formatted text stream including a link description which includes multimedia device-type information, object location information and multimedia control information for a target multimedia object, said formatted text stream further including a link tag associated with said link description said tag identifying a source location in said formatted text stream from which a link is established to said target multimedia object;

storing said multimedia object in said data processing system at a location identified by said location information, said object including multimedia data representing a multimedia presentation;

storing a multimedia handler program in said data processing system, said processor controlling operations of a multimedia output device characterized by said multimedia device-type information, when said processor executes said handler program;

displaying said formatted text stream in said data processing system;

activating said link tag in said data processing system and in response thereto, transferring from said link description to said processor, said multimedia control information;

executing said multimedia handler program in said processor using said control information and in response thereto, transferring from said location identified by said location information to said multimedia output device, said multimedia data from said multimedia object;

producing said multimedia presentation with said multimedia output device in using said multimedia data from said multimedia object;

(a) storing an I/O support profile in said data processing system, specifying said multimedia output device which is coupled to said data processing; said link description includes a first object name, a first object location and first device control information for a first multimedia object and said link description further includes a second object name, a second object location and second device control information for a second multimedia object;

(b) determining with said processor executing said multimedia handler program whether said multimedia output device is capable of producing said multimedia presentation with said first multimedia object;

(c) producing said multimedia presentation with said multimedia output device using said multimedia data from said first multimedia object, upon determining that said multimedia output device is capable of producing said presentation with said first object;

(d) determining with said processor executing said multimedia handler program whether said multimedia output device is capable of producing said multimedia presentation with said second multimedia object upon determining that said multimedia output device is not capable of producing said presentation with said first object;

(e) producing said multimedia presentation with said multimedia output device using multimedia data from said second multimedia object upon determining that said multimedia output device is not capable of producing said presentation with said first object.

4. A data processing system including a processor, for providing a link from a reference point within a link from a reference point within a hierarchy of a formatted text stream in an on-line book, to a multimedia object, comprising:

a memory in said system for storing a formatted text stream in said data processing system;

said formatted text stream including a link description which includes multimedia device-type information, object location information and multimedia control information for a target multimedia object said formatted text stream further including a link tag associated with said link description, said tag identifying a source location in said formatted text stream from which a link is established to said target multimedia object;

said memory storing said multimedia object in said data processing system at a location identified by said location information, said object including multimedia data representing a multimedia presentation;

said memory storing a multimedia handler program in said data processing system, said processor controlling operations of a multimedia output device characterized by said multimedia device-type information when said processor executes said handler program;

a display coupled to said memory in said system, for displaying said formatted text stream in said data processing system;

said processor coupled to said memory in said system, for activating said link tag in said data processing system and in response thereto, accessing said multimedia control information;

said processor executing said multimedia handler program sing said control information and in response thereto, transferring from said location identified by said location information to said multimedia output device, said multimedia data from said multimedia object;

said multimedia output device producing said multimedia presentation using said multimedia data from said multimedia object;

said link description includes a first object name, a first object location and first device control information for a first multimedia object and said link description further includes a second object name, a second object location and second device control information for a second multimedia object;

said multimedia output device producing said multimedia presentation using said multimedia data from said first multimedia object, upon determining that said multimedia output device is capable of producing said presentation with said first object;

said processor determining by executing said multimedia handler program whether said multimedia output device is capable of producing said multimedia presentation with said second multimedia object upon determining that said multimedia output device is not capable of producing said presentation with said first object;

said multimedia output device producing said multimedia presentation using multimedia data from said second multimedia object upon determining that said multimedia output device is not capable of producing said presentation with said first object.

5. A data processing system including a processor, for providing a link from a reference point within a link from a reference point within a hierarchy of a formatted text stream in an on-line book, to a multimedia objects, comprising:

a memory in said system for storing a formatted text stream in said data processing system;

said formatted text stream including a link description which includes multimedia device-type information, object location information and multimedia control information for a target multimedia object;

said formatted text stream further including a link tag associated with said link description, said tag identifying a source location in said formatted text stream from which a link is established to said target multimedia object;

said memory storing said multimedia object in said data processing system at a location identified by said location information, said object including multimedia data representing a multimedia presentation;

said memory storing a multimedia handler program in said data processing system, said processor controlling operations of a multimedia output device characterized by said multimedia device-type information when said processor executes said handler program;

a display coupled to said memory in said system, for displaying said formatted text stream in said data processing system;

said processor coupled to said memory in said system, for activating said link tag in said data processing system and in response thereto, accessing said multimedia control information;

said processor executing said multimedia handler program sing said control information and in response thereto, transferring from said location identified by said location information to said multimedia output device, said multimedia data from said multimedia object;

said multimedia output device producing said multimedia presentation using said multimedia data from said multimedia object;

said memory storing an I/O support profile in said data processing system, specifying said multimedia output device which is coupled to said data processing system;

said processor executing said multimedia handler program to determine whether said multimedia output device is capable of producing said multimedia presentation with said multimedia object;

said multimedia output device producing said multimedia presentation using said multimedia data from said multimedia object, upon determining that said multimedia output device is capable of producing said presentation.

6. A data processing system including a processor, for providing a link from a reference point within a link from a reference point within a hierarchy of a formatted text stream in an on-line book, to a multimedia object, comprising:

a memory in said system for storing a formatted text stream in said data processing system;

said formatted text stream including a link description which includes multimedia device-type information, object location information and multimedia control information for a target multimedia object;

said formatted text stream further including a link tag associated with said link description, said tag identifying a source location in said formatted text stream from which a link is established to said target multimedia object;

said memory storing said multimedia object in said data processing system at a location identified by said location information, said object including multimedia data representing a multimedia presentation;

said memory storing a multimedia handler program in said data processing system said processor controlling operations of a multimedia output device characterized by said multimedia device-type information when said processor executes said handler program;

a display coupled to said memory in said system, for displaying said formatted text stream in said data processing system;

said processor coupled to said memory in said system, for activating said link tag in said data processing system and in response thereto, accessing said multimedia control information;

said processor executing said multimedia handler program sing said control information and in response thereto, transferring from said location identified by said location information to said multimedia output device, said multimedia data from said multimedia object;

said multimedia output device producing said multimedia presentation using said multimedia data from said multimedia object;

said memory storing an I/O support profile in said data processing system, specifying said multimedia output device which is coupled to said data processing system;

said link description includes a first object name, a first object location and first device control information for a first multimedia object and said link description further includes a second object name, a second object location and second device control information for a second multimedia object;

said processor executing said multimedia handler program to determine whether said multimedia output device is capable of producing said multimedia presentation with said multimedia object;

said multimedia output device producing said multimedia presentation using said multimedia data from said multimedia object, upon determining that said multimedia output device is capable of producing said presentation with said first object;

said processor executing said multimedia handler program to determine whether said multimedia output device is capable of producing said multimedia presentation with said second multimedia object upon determining that said multimedia output device is not capable of producing said presentation with said first object;

said multimedia output device producing said multimedia presentation using multimedia data from said second multimedia object upon determining that said multimedia output device is not capable of producing said presentation with said first object.

7. A method in a data processing system including a processor, for providing a control form a reference point within a hierarchy of a formatted text stream in an on-line book, to a multimedia output device, comprising the steps of:

storing a formatted text stream in said data processing system, said formatted text stream including a link information which identifies a source location in said formatted text stream from which a link is established to a target multimedia object and an object location and multimedia device control information for a multimedia output device;

storing said multimedia object in said data processing system at said object location identified by said link information, said object including multimedia data representing a multimedia presentation;

storing a multimedia handler program in said data processing system, said processor controlling operations of said multimedia output device, when said processor executes said handler program;

activating said link in said data processing system and in response thereto, transferring to said processor said multimedia control information;

executing said multimedia handler program in said processor using said control information and in response thereto, transferring from said object location identified by said link information to said multimedia output device, said multimedia data from said multimedia object;

producing said multimedia presentation of said multimedia data with said multimedia output device under control of said multimedia handler program using said control information;

storing an I/O support profile in said data processing system, specifying said multimedia output device which is coupled to said data processing system;

determining with said processor executing said multimedia handler program whether said multimedia output device is capable of producing said multimedia presentation with said multimedia object;

producing said multimedia presentation with said multimedia output device using said multimedia data from said multimedia object, upon determining that said multimedia output device is capable of producing said presentation.

8. A method in a data processing system including a processor, for providing a control form a reference point within a hierarchy of a formatted text stream in an on-line book, to a multimedia output device comprising the steps of:

storing a formatted text stream in said data processing system, said formatted text stream including a link information which identifies a source location in said formatted text stream from which a link is established to a target multimedia object and an object location and multimedia device control information for a multimedia output device;

storing said multimedia object in said data processing system at said object location identified by said link information, said object including multimedia data representing a multimedia presentation;

storing a multimedia handler program in said data processing system, said processor controlling operations of said multimedia output device, when said processor executes said handler program;

activating said link in said data processing system and in response thereto, transferring to said processor said multimedia control information;

executing said multimedia handler program in said processor using said control information and in response thereto, transferring from said object location identified by said link information to said multimedia output device, said multimedia data from said multimedia object;

producing said multimedia presentation of said multimedia data with said multimedia output device under control of said multimedia handler program using said control information;

(a) storing an I/O support profile in said data processing system, specifying said multimedia output device which is coupled to said data processing system; said link information includes a first object name and a first object location and said control information includes first device control information for a first multimedia object and said link information further includes second device object name and a second object location and said control information includes a second control information for a second multimedia object;

(b) determining with said processor executing said multimedia handler program to determine whether said multimedia output device is capable of producing said multimedia presentation with said first multimedia object;

(c) producing said multimedia presentation with said multimedia output device using said multimedia data from said first multimedia object, upon determining that said multimedia output device is capable of producing said presentation with said first object;

(d) determining with said processor executing said multimedia handler program to determine whether said multimedia output device is capable of producing said multimedia presentation with said second multimedia object upon determining that said multimedia output device is not capable of producing said presentation with said first object;

(e) producing said multimedia presentation with said multimedia output device using multimedia data from said second multimedia object upon determining that said multimedia output device is capable of producing said presentation with said first object.

* * * * *